US006725653B2

(12) United States Patent
Brown et al.

(10) Patent No.: US 6,725,653 B2
(45) Date of Patent: Apr. 27, 2004

(54) PROCESS FOR REDUCING POLLUTANTS FROM THE EXHAUST OF A DIESEL ENGINE USING A WATER DIESEL FUEL IN COMBINATION WITH EXHAUST AFTER-TREATMENTS

(75) Inventors: Kevin F. Brown, Newmarket (CA); Ted N. Tadrous, Newmarket (CA); Deborah A. Langer, Chesterland, OH (US); David A. Duncan, Derbyshire (GB)

(73) Assignee: The Lubrizol Corporation, Wickliffe, OH (US)

( * ) Notice: Subject to any disclaimer, the term of this patent is extended or adjusted under 35 U.S.C. 154(b) by 0 days.

(21) Appl. No.: 10/456,705

(22) Filed: Jun. 6, 2003

(65) Prior Publication Data

US 2003/0196430 A1 Oct. 23, 2003

Related U.S. Application Data

(63) Continuation of application No. 09/882,764, filed on Jun. 15, 2001.
(60) Provisional application No. 60/212,776, filed on Jun. 20, 2000.

(51) Int. Cl.[7] .................................................. F01N 3/00
(52) U.S. Cl. ............................ 60/297; 60/274; 60/295; 60/299; 60/311; 123/1 A; 44/301; 44/358; 44/359; 44/361
(58) Field of Search .......................... 60/274, 285, 286, 60/295, 297, 299, 311, 300, 284; 123/1 A; 44/358, 359, 361, 363, 301, 357, 459

(56) References Cited

U.S. PATENT DOCUMENTS

| | | |
|---|---|---|
| 2,858,200 A | 10/1958 | Broughten |
| 3,756,794 A | 9/1973 | Ford |
| 4,048,080 A | 9/1977 | Lee et al. |
| 4,084,940 A | 4/1978 | Lissant |
| 4,207,078 A | 6/1980 | Sweeney et al. |
| 4,329,249 A | 5/1982 | Forsberg |
| 4,447,348 A | 5/1984 | Forsberg |
| 4,452,712 A | 6/1984 | Laemmle |
| 4,482,356 A | 11/1984 | Hanlon |
| 4,561,861 A | 12/1985 | Davis et al. |
| 4,585,461 A | 4/1986 | Gorman |
| 4,613,341 A | 9/1986 | Zaweski et al. |
| 4,629,472 A | 12/1986 | Haney, III et al. ............... 44/51 |
| 4,708,753 A | 11/1987 | Forsberg |
| 4,892,562 A | 1/1990 | Bowers et al. |
| 4,907,368 A | 3/1990 | Mullay et al. .................. 44/51 |
| 4,952,328 A | 8/1990 | Davisd et al. ............. 252/32.7 |
| 5,047,175 A | 9/1991 | Forsberg ..................... 252/356 |
| 5,279,626 A | 1/1994 | Cunningham et al. |
| 5,352,377 A | 10/1994 | Blain et al. |
| 5,360,458 A | 11/1994 | Forsberg et al. ............... 44/301 |
| 5,371,056 A | 12/1994 | Leyrer et al. ................. 502/66 |

(List continued on next page.)

FOREIGN PATENT DOCUMENTS

| | | |
|---|---|---|
| AU | 711348 | 10/1997 |
| EP | 0 475 620 A2 | 3/1992 |
| EP | 0 561 600 A2 | 9/1993 |
| EP | 0 888 421 B1 | 1/1999 |
| WO | 97/34969 | 9/1997 |

OTHER PUBLICATIONS

"Cellular Monolith Substrates," DieselNet Technology Guide, 1998.

*Primary Examiner*—Binh Tran
(74) *Attorney, Agent, or Firm*—Teresan W. Gilbert; Michael F. Esposito

(57) ABSTRACT

This invention relates to a process for reducing the level of pollutants in the exhaust of a diesel engine, comprising: operating said diesel engine using as the fuel a water-diesel fuel emulsion; and contacting the exhaust gas from said diesel engine with an after-treatment such as a filter.

23 Claims, 4 Drawing Sheets

SAMPLING SYSTEM USED FOR TRANSIENT EMISSION MEASUREMENTS

U.S. PATENT DOCUMENTS

| | | |
|---|---|---|
| 5,389,111 A | 2/1995 | Nikanjam et al. |
| 5,389,112 A | 2/1995 | Nikanjam et al. |
| 5,404,841 A | 4/1995 | Valentine ..................... 123/25 |
| 5,452,577 A | 9/1995 | Langer ........................ 60/299 |
| 5,454,964 A | 10/1995 | Blackborow et al. |
| 5,462,907 A | 10/1995 | Farrauto et al. ............. 502/304 |
| 5,491,120 A | 2/1996 | Voss et al. .................. 502/304 |
| 5,501,714 A | 3/1996 | Valentine et al. |
| 5,503,772 A | 4/1996 | Rivas et al. |
| 5,535,708 A | 7/1996 | Valentine ..................... 123/25 |
| 5,584,894 A | 12/1996 | Peter-Hoblyn et al. ....... 44/301 |
| 5,627,124 A | 5/1997 | Farrauto et al. ............. 502/304 |
| 5,669,938 A | 9/1997 | Schwab |
| 5,693,106 A | 12/1997 | Peter-Hoblyn et al. ....... 44/301 |
| 5,743,922 A | 4/1998 | Peter-Hoblyn et al. ....... 44/301 |
| 5,746,783 A | 5/1998 | Compere et al. ............. 44/301 |
| 5,809,774 A | 9/1998 | Peter-Hoblyn et al. ........ 60/274 |
| 5,809,775 A | 9/1998 | Tarabulski et al. ............ 60/274 |
| 5,820,640 A | 10/1998 | Ikura et al. .................... 44/301 |
| 5,873,916 A | 2/1999 | Cemenska et al. ............ 44/301 |
| 5,879,419 A | 3/1999 | Moriyama et al. |
| 5,924,280 A | 7/1999 | Tarabulski .................... 60/274 |
| 5,976,475 A | 11/1999 | Peter-Hoblyn et al. ..... 324/212 |
| 5,987,882 A | 11/1999 | Voss et al. .................... 60/274 |
| 6,003,303 A | 12/1999 | Peter-Hoblyn et al. ........ 60/274 |
| 6,006,516 A | 12/1999 | Voss et al. .................... 60/299 |
| 6,051,040 A | 4/2000 | Peter-Hoblyn ............... 44/358 |
| 6,068,670 A | 5/2000 | Haupais et al. ............... 44/301 |
| 6,176,078 B1 | 1/2001 | Balko et al. .................. 60/286 |
| 6,280,485 B1 * | 8/2001 | Daly et al. .................... 44/301 |
| 6,606,856 B1 * | 8/2003 | Brown et al. ................. 60/299 |

* cited by examiner

SAMPLING SYSTEM USED FOR TRANSIENT EMISSION MEASUREMENTS

Exhaust cooler arrangement
for position 602 DPF sooting cycle

PROCESS FOR REDUCING POLLUTANTS FROM THE EXHAUST OF A DIESEL ENGINE USING A WATER DIESEL FUEL IN COMBINATION WITH EXHAUST AFTER-TREATMENTS

This application is a continuation of patent application U.S. Ser. No. 09/882,764 filed Jun. 15, 2001 which claims priority from U.S. provisional application U.S. Ser. No. 60/212,776 filed Jun. 20, 2000.

TECHNICAL FIELD

This invention relates to a process for reducing the level of pollutants from the exhaust of a diesel engine. More particularly, this invention relates to a process for reducing the level of pollutants such as NOx and diesel particulate emissions from the exhaust of a diesel engine wherein a water-diesel fuel emulsion is used as the fuel in combination with exhaust after treatment products to treat the engine exhaust.

BACKGROUND OF THE INVENTION

The term "NOx" is used herein to refer to any of the nitrogen oxides NO, $NO_2$, $N_2O$, or combinations thereof. Over the past ten years, increasingly more stringent heavy duty on-highway engine emission regulations have led to the development of engines in which NOx and diesel particulate emissions have been reduced by as much as 70% and 90%, respectively.

The term "filter" used herein refers to any of the after-treatment filters, traps, particulate filters, particulate traps, and the like.

Proposed regulations for new heavy duty engines require additional NOx and diesel particulate emission reductions of over 70% from existing emission limits. These emission reductions represent a continuing challenge to engine design due to the NOx-diesel particulate emission and fuel economy tradeoffs associated with most emission reduction strategies. Emission reductions are also desired for the on and off-highway in-use fleets. Within the heavy duty engine population, it is becoming more apparent that older engines are contributing a disproportionate amount of emissions. Many of these engines have useful lives of over 15 years. To meet the air quality objectives in many regional areas, reductions in NOx and diesel particulate emissions will need to be derived from the in-use, mobile source engine population. In some regional areas, the proposed emission reductions from the engines in-use potentially represent an even greater challenge than the emission limits proposed for new engines.

It is recognized that the engine, lubricants, fuel, and exhaust after-treatments need to be integrated into a system to maximize the control of and reduction of emissions.

Recent engine work focuses on improvements or incorporation of new technologies to the power cylinder, air delivery, fuel management, and electronic systems. These improvements typically satisfy the emission requirements of new engines. Some improvements can also be implemented during the engine rebuild process; however, internal engine modifications are not broadly and practically applicable to in-use fleets.

Some new engines require the use of diesel exhaust after-treatment products to meet diesel particulate matter limits. This technology can be readily retrofitted with generally no engine modifications required.

In the urban environment, health concerns regarding diesel particulate emissions are resulting in thousands of buses being retrofitted with after-treatment technologies such as particulate filters and oxidation catalyst technologies. In the United States, the implementation of the urban bus rebuild/retrofit requirements increased interest in emission reduction technologies for in-use heavy duty diesel vehicle fleets.

Diesel fuel improvements have been introduced in most parts of the developed world to provide reductions in particulates and NOx from the vehicle fleets in current operation as well as to facilitate the introduction of after-treatment devices. Reducing the sulfur content and the "heavy end" of the fuel have been the key changes. In the United Kingdom, the government has offered tax incentives to initiate the use of a grade of diesel fuel termed ultra low sulfur diesel (ULSD), which has a maximum 50 parts per million (ppm) sulfur content and a 95% distillation temperature of less than 345° C. As well as achieving immediate reductions in particulates and NOx from the current vehicle fleet, the availability of ULSD was intended to encourage the use of after-treatment technologies of particulate filters, oxidation catalysts and the like.

Diesel fuel improvements typically involve the reduction of fuel sulfur via hydrotreating to levels as low as 10 ppm (Swedish Mk 1 fuel). Other fuel parameters such as aromatics and cetane have also been the subject of investigation. Specially manufactured fuels and the incorporation of special fuel components such as biodiesels, Fisher Tropsch blends, methanol, and ethanol, are also gaining attention.

While many of the foregoing suggestions are meritorious, the problem remains that further reductions in pollutants, especially NOx and diesel particulate emissions, are required. The inventive process provides a solution to this problem.

SUMMARY OF THE INVENTION

This invention relates to a process for reducing the level of pollutants in the exhaust of a diesel engine, comprising: operating said diesel engine using as the fuel a water-diesel fuel emulsion; and contacting the exhaust from said diesel engine with a particulate filter/trap.

The water-diesel fuel emulsion is comprised of water, diesel fuel and an emulsifier. The emulsifier comprises: (i) at least one fuel-soluble product made by reacting at least one hydrocarbyl-substituted carboxylic acid acylating agent with ammonia or an amine, the hydrocarbyl substituent of said acylating agent having about 50 to about 500 carbon atoms; (ii) at least one of an ionic or a nonionic compound having a hydrophilic-lipophilic balance (HLB) of about 1 to about 40; (iii) a mixture of (i), (ii); (iv) a water-soluble compound selected from the group consisting of amine salts, ammonium salts, azide compounds, nitrate esters, nitramine, nitro compounds, alkali metal salts, alkaline earth metal salts, in combination with (i), (ii) or (iii); (v) the reaction product of polyacidic polymer with at least one fuel soluble product made by reacting at least one hydrocarbyl-substituted carboxylic acid acylating agent with ammonia, an amine or a polyamine and (vi), a mixture of (ii) and (v).

The process for making an aqueous hydrocarbon fuel composition comprises:
a) mixing a liquid hydrocarbon fuel and at least one emulsifier to form a hydrocarbon fuel emulsifier mixture; and
b) mixing the hydrocarbon fuel emulsifier mixture with water or water and ammonium nitrate under emulsification conditions to form an aqueous hydrocarbon fuel composition, wherein the aqueous hydrocarbon fuel composition includes a discontinuous phase, the discontinuous aqueous phase being comprised of aqueous droplets having a mean diameter of 1.0 micron or less.

The filter system generally contains the following components: filter medium, regeneration system and monitoring system. The filter reduces the particulate matter emissions that are generally created during combustion and normally emitted with the exhaust.

It has been found that by using the combination of a water-diesel fuel emulsion and a diesel particulate filter to treat the exhaust from the engine that improvements occur in exhaust emissions of PM (particulate matter) and NOx.

In regards to diesel particular filters (DPF's), there are two key characteristics of the combustion of water-blended fuel. First, the use of water-blended fuel reduces the diesel particulate matter emissions emitted by the engine. Second, the reduction in the diesel particulate matter emissions is largely a reduction of the insoluble carbon portion. The reduction of the insoluble carbon portion of the emitted diesel particulate results in a higher proportion of the volatile organic portion.

The following improvements are apparent:

That an engine running water-blended fuel equipped with a diesel particulate filter displays a lower particulate accumulation rate in the diesel particulate filter and lower back pressure due to the favorable change in soot permeability. This in turn promotes better fuel economy or the capability to reduce the size of the diesel particulate filter.

That the lower accumulated diesel particulate matter mass in a diesel particulate filter is characterized by a lower proportion of the insoluble carbon portion and a higher proportion of the volatile organic portion. The reduced engine-out particulate mass which is a direct result of combusting an emulsified fuel means that less particulate will be accumulated under low exhaust temperature conditions. This will extend the use of diesel particulate filters to applications with lower exhaust temperatures. Further, the shift to higher proportion of volatile organics will result in additional reductions in exhaust restriction as a result of the increased combined permeability for accumulated soot and diesel particulate filter material.

That an engine running water-blended fuel equipped with a diesel particulate filter which relies on an exhaust fuel burner, electric heater, thermal and non-thermal plasma, microwave, engine control measures (i.e., fuel injection timing, control of turbocharging, and the like) or other external supply of heat to regenerate; that the DPF requires less frequent regeneration and uses less fuel/electrical energy or other energy during regeneration.

That any engine running water blended fuel equipped with a diesel particulate filter that relies on passive regeneration (filter supported heterogeneous soot ignition catalysts or fuel borne soot ignition additive/catalysts) or continuous regeneration (through the generation of nitrogen dioxide ($NO_2$), requires regeneration less often. Thus, the use of water blended fuel and a diesel particulate filter effectively extends the operational low temperature limit of passive or continuous catalyst systems, which allows passive or continuous regeneration strategies to be employed on vehicles with colder vehicle duty cycles.

THE DIESEL ENGINES

Figure 1:
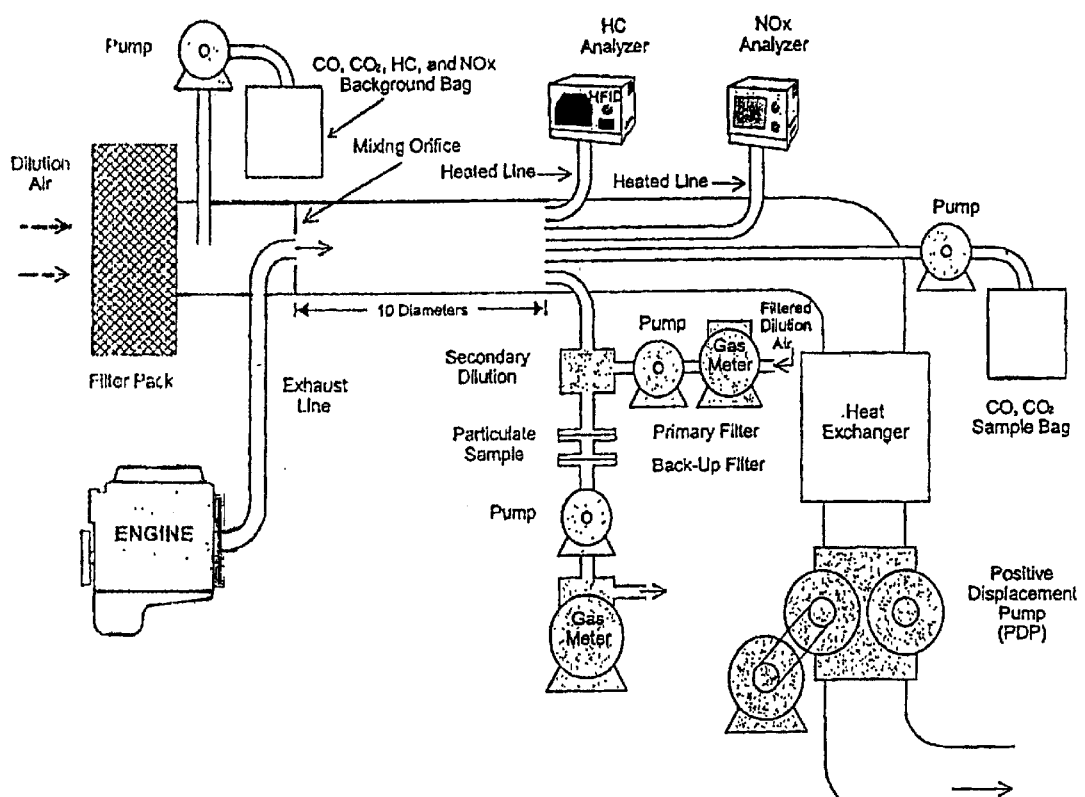
FIG. 1 is an illustration of a sampling system for transient emissions measurements.
Figure 2:
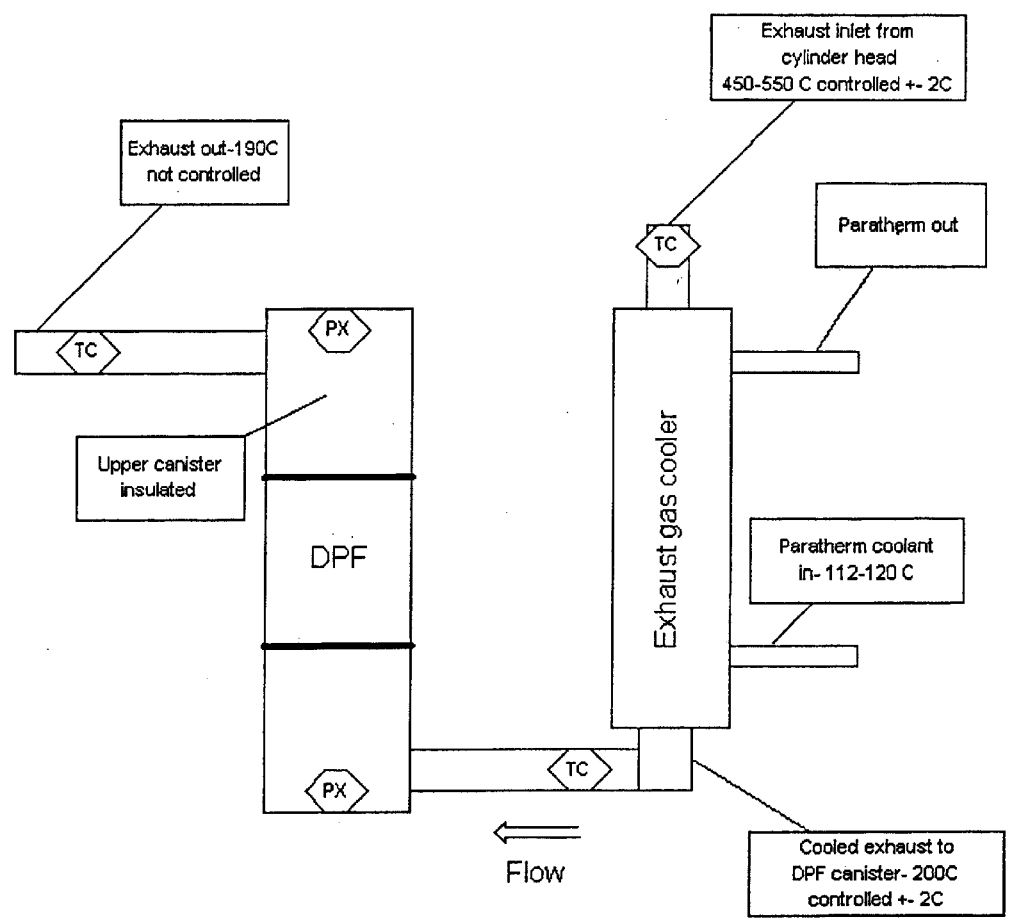
FIG. 2 is a diagram for an exhaust cooler arrangement for position 602 DPF sooting system.

The diesel engines that may be operated in accordance with the invention include all compression-ignition engines for both mobile (including locomotive and marine) and stationary power plants. These include diesel engines of the two-stroke-per-cycle and four-stroke-per-cycle types. The diesel engines, include but are not limited to light and heavy duty diesel engines and on and off-highway engines, including new engines as well as in-use engines. The diesel engines include those used in automobiles, trucks, buses including urban buses, locomotives, stationary generators, and the like.

The Water-Diesel Fuel Emulsions

The water-diesel fuel emulsions comprise: a continuous diesel fuel phase; a discontinuous water or aqueous phase being comprised of aqueous droplets having a mean diameter of 1.0 micron or less; and an emulsifying amount of at least one emulsifier. These emulsions may be prepared by the steps of (1) mixing the diesel fuel, emulsifier and other desired additives using standard mixing techniques to form a diesel fuel-emulsifier mixture; and (2) mixing the diesel fuel-emulsifier mixture with water (and optionally an antifreeze agent) under emulsification mixing conditions to form the desired water-diesel fuel emulsion.

Optionally, additives may be added to the emulsifier, the fuel, the water or combinations thereof. The additives include but are not limited to cetane improvers, organic solvents, antifreeze agents, surfactants, other additives known for their use in fuel and the like. The additives are added to the emulsifier, hydrocarbon fuel or the water prior to and in the alternative at the emulsification device dependent upon the solubility of the additive. However, it is preferable to add the additives to the emulsifier to form an additive emulsifier mixture. The additives are generally in the range of about 1% to about 40% by weight, in another embodiment about 5% to about 30% by weight, and in another embodiment about 7% to about 25% by weight of the additive emulsifier mixture.

The diesel fuel emulsifier mixtures contains about 50% to about 99% by weight, in another embodiment about 85% to about 98% by weight; and in another embodiment about 95% to about 98% by weight hydrocarbon fuel, and it further contains about 0.05% to about 25%, in another embodiment about 1% to about 15%, and in another embodiment about 2% to about 5% by weight of the emulsifier.

The water, which can optionally include but is not limited to antifreeze, ammonium nitrate or mixtures thereof. Ammonium nitrate is generally added to the water mixture as aqueous solution. In one embodiment the water, the alcohol and/or the ammonium nitrate are mixed dynamically and fed continuously to the fuel additives stream. In another embodiment the water, antifreeze, ammonium nitrate or mixtures thereof flow out of separate tanks and/or combinations thereof into or mixed prior to the emulsification device. In one embodiment the water, water alcohol, water-ammonium-nitrate, or water-alcohol ammonium nitrate mixture meets the hydrocarbon fuel additives mixture immediately prior to or in the emulsification device.

An example of an emulsification device that may be used is a Dispax-Reactor DR 3/9 made by IKA-Maschinbau equipped with a 20 HP motor. In one embodiment, this mixer has three Ultra-Turrax UTL-T . . . /8 rotor-stators in series, and the rotors rotate at about 5500 rpm.

The water or aqueous phase of the water-diesel fuel emulsion is comprised of droplets having a mean diameter of 1.0 micron or less. Thus, the emulsification is conducted under sufficient conditions to provide such a droplet size. In one embodiment, the mean droplet size is less than about 0.95 micron, and in one embodiment less than about 0.8 micron, and in one embodiment less than about 0.7 micron. In one embodiment, the mean droplet size is in the range of about 0.001 to about 1.0 micron, and in one embodiment about 0.001 to about 0.95 micron, and in one embodiment about 0.01 to about 0.95 micron, and in one embodiment about 0.01 to about 0.8 micron, and in one embodiment about 0.01 to about 0.7 micron.

The Diesel Fuels

The diesel fuel may be any diesel fuel. These diesel fuels typically have a 90% point distillation temperature in the range of about 295° C. to about 390° C., and in one embodiment about 330° C. to about 350° C. The viscosity for these fuels typically ranges from about 1 to about 24 centistokes at 40° C. The diesel fuels may be classified as any of Grade Nos. 1-D, 2-D or 4-D as specified in ASTM D975. These diesel fuels may contain alcohols (e.g., methanol, ethanol, and the like), esters, and fuel components such as biodiesels, Fisher Tropsch blends, and the like. In one embodiment, the diesel fuel is an ultra low sulfur diesel fuel (ULSD) having a maximum of 50 ppm sulfur and a 95% distillation temperature of less than about 345° C. In one embodiment the diesel fuel has a sulfur content of up to about 0.05% by weight as determined by the test method specified in ASTM D2622-87. In one embodiment, the diesel fuel is a chlorine-free or low-chlorine diesel fuel characterized by a chlorine content of no more than about 10 ppm.

The diesel fuel may be present in the water-diesel fuel emulsions at a concentration of about 50% to about 98% by weight, and in one embodiment about 50% to about 95% by weight, and in one embodiment about 60% to about 95% by weight, and in one embodiment about 75% to about 95% by weight, and in one embodiment about 75% to about 92% by weight.

The Water

The water used in forming the water-diesel fuel emulsions may be taken from any source. The water includes but is not limited to deionized water or demineralized water, purified water using reverse osmosis or distillation, and the like.

The water may be present in the water-diesel fuel emulsions at a concentration of about 1% to about 50% by weight, and in one embodiment about 5% to about 50% by weight, and in one embodiment about 5% to about 40% by weight, and in one embodiment about 5% to about 25% by weight, and in one embodiment about 10% to about 20% water.

The Emulsifier

The emulsifier is comprised of: (i) at least one fuel-soluble product made by reacting at least one hydrocarbyl-substituted carboxylic acid acylating agent with ammonia or an amine, the hydrocarbyl substituent of said acylating agent having about 50 to about 500 carbon atoms; (ii) at least one of an ionic or a nonionic compound having a hydrophilic-lipophilic balance (HLB) in one embodiment of about 1 to about 40; in one embodiment about 1 to about 30, in one embodiment about 1 to about 20, and in one embodiment about 1 to about 15; (iii) a mixture of (i) and (ii); (iv) a water-soluble compound selected from the group consisting of amine salts, ammonium salts, azide compounds, nitro compounds, alkali metal salts, alkaline earth metal salts, and mixtures thereof in combination of with (i), (ii) or (iii); (v) the reaction product of a polyacidic polymer with at least one fuel soluble product which fuel-soluble product is made by reacting at least one hydrocarbyl-substituted carboxylic acid acylating agent with ammonia, an amine or polyamine or (vi), a mixture of (ii) and (v).

The emulsifier may be present in the water fuel emulsion at a concentration of about 0.05% to about 20% by weight, and in one embodiment about 0.05% to about 10% by weight, and in one embodiment about 0.1% to about 5% by weight, and in one embodiment about 0.1% to about 3% by weight.

The Fuel-Soluble Product (i)

The fuel-soluble product (i) may be at least one fuel-soluble product made by reacting at least one hydrocarbyl-substituted carboxylic acid acylating agent with ammonia or an amine, the hydrocarbyl substituent of said acylating agent having about 50 to about 500 carbon atoms.

The hydrocarbyl-substituted carboxylic acid acylating agents may be carboxylic acids or reactive equivalents of such acids. The reactive equivalents may be an acid halides, anhydrides, or esters, including partial esters and the like. The hydrocarbyl substituents for these carboxylic acid acylating agents may contain from about 50 to about 500 carbon atoms, and in one embodiment about 50 to about 300 carbon atoms, and in one embodiment about 60 to about 200 carbon atoms. In one embodiment, the hydrocarbyl substituents of these acylating agents have number average molecular weights of about 700 to about 3000, and in one embodiment about 900 to about 2300.

The hydrocarbyl-substituted carboxylic acid acylating agents may be made by reacting one or more alpha-beta olefinically unsaturated carboxylic acid reagents containing 2 to about 20 carbon atoms, exclusive of the carboxyl groups, with one or more olefin polymers as described more fully hereinafter.

The alpha-beta olefinically unsaturated carboxylic acid reagents may be either monobasic or polybasic in nature. Exemplary of the monobasic alpha-beta olefinically unsaturated carboxylic acid include the carboxylic acids corresponding to the formula:

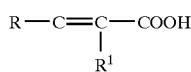

wherein R is hydrogen, or a saturated aliphatic or alicyclic, aryl, alkylaryl or heterocyclic group, preferably hydrogen or a lower alkyl group, and $R^1$ is hydrogen or a lower alkyl group. The total number of carbon atoms in R and $R^1$ typically does not exceed about 18 carbon atoms. Specific examples of useful monobasic alpha-beta olefinically unsaturated carboxylic acids include acrylic acid; methacrylic acid; cinnamic acid; crotonic acid; 3-phenyl propenoic acid; alpha, and beta-decenoic acid. The polybasic acid reagents are preferably dicarboxylic, although tri- and tetracarboxylic acids can be used. Exemplary polybasic acids include maleic acid, fumaric acid, mesaconic acid, itaconic acid and citraconic acid. Reactive equivalents of the alpha-beta olefinically unsaturated carboxylic acid reagents include the anhydride, ester or amide functional derivatives of the foregoing acids. A useful reactive equivalent is maleic anhydride.

The olefin monomers from which the olefin polymers may be derived are polymerizable olefin monomers characterized by having one or more ethylenic unsaturated groups. They may be monoolefinic monomers such as ethylene, propylene, 1-butene, isobutene and 1-octene or polyolefinic monomers (usually di-olefinic monomers such as 1,3-butadiene and isoprene). Usually these monomers are terminal olefins, that is, olefins characterized by the presence of the group>C=CH$_2$. However, certain internal olefins can also serve as monomers (these are sometimes referred to as medial olefins). When such medial olefin monomers are used, they normally are employed in combination with terminal olefins to produce olefin polymers that are interpolymers. Although, the olefin polymers may also include aromatic groups (especially phenyl groups and lower alkyl and/or lower alkoxy-substituted phenyl groups such as para (tertiary-butyl)-phenyl groups) and alicyclic groups such as would be obtained from polymerizable cyclic olefins or alicyclic-substituted polymerizable cyclic olefins, the olefin polymers are usually free from such groups. Nevertheless, olefin polymers derived from such interpolymers of both 1,3-dienes and styrenes such as 1,3-butadiene and styrene or para-(tertiary butyl) styrene are exceptions to this general rule. In one embodiment, the olefin polymer is a partially hydrogenated polymer derived from one or more dienes. Generally the olefin polymers are homo- or interpolymers of terminal hydrocarbyl olefins of about 2 to about 30 carbon atoms, and in one embodiment about 2 to about 16 carbon atoms. A more typical class of olefin polymers is selected from that group consisting of homo- and interpolymers of terminal olefins of 2 to about 6 carbon atoms, and in one embodiment 2 to about 4 carbon atoms.

Specific examples of terminal and medial olefin monomers which can be used to prepare the olefin polymers include ethylene, propylene, 1-butene, 2-butene, isobutene, 1-pentene, 1-hexene, 1-heptene, 1-octene, 1-nonene, 1-decene, 2-pentene, propylene tetramer, diisobutylene, isobutylene trimer, 1,2-butadiene, 1,3-butadiene, 1,2-pentadiene, 1,3-pentadiene, isoprene, 1,5-hexadiene, 2-chloro 1,3-butadiene, 2-methyl-1-heptene, 3-cyclohexyl-1 butene, 3,3-dimethyl 1-pentene, styrene, divinylbenzene, vinyl-acetate, allyl alcohol, 1-methylvinylacetate, acrylonitrile, ethyl acrylate, ethylvinylether and methylvinylketone. Of these, the purely hydrocarbon monomers are more typical and the terminal olefin monomers are especially useful.

In one embodiment, the olefin polymers are polyisobutenes such as those obtained by polymerization of a C$_4$ refinery stream having a butene content of about 35 to about 75% by weight and an isobutene content of about 30 to about 60% by weight in the presence of a Lewis acid catalyst such as aluminum chloride or boron trifluoride. These polyisobutenes generally contain predominantly (that is, greater than about 50% of the total repeat units) isobutene repeat units of the configuration:

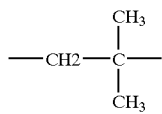

In one embodiment, the olefin polymer is a polyisobutene group (or polyisobutylene group) having a number average molecular weight of about 700 to about 3000, and in one embodiment about 900 to about 2300.

In one embodiment, the hydrocarbyl-substituted carboxylic acid acylating agent is a hydrocarbyl-substituted succinic acid or anhydride represented correspondingly by the formulae:

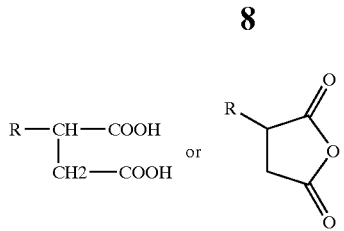

wherein R is hydrocarbyl group of about 50 to about 500 carbon atoms, and in one embodiment from about 50 to about 300, and in one embodiment from about 60 to about 200 carbon atoms. The production of these hydrocarbyl-substituted succinic acids or anhydrides via alkylation of maleic acid or anhydride or its derivatives with a halohydrocarbon or via reaction of maleic acid or anhydride with an olefin polymer having a terminal double bond is well known to those of skill in the art and need not be discussed in detail herein.

The hydrocarbyl-substituted carboxylic acid acylating agent may be a hydrocarbyl-substituted succinic acylating agent consisting of hydrocarbyl substituent groups and succinic groups. The hydrocarbyl substituent groups are derived from olefin polymers as discussed above. In one embodiment, the hydrocarbyl-substituted carboxylic acid acylating agent is characterized by the presence within its structure of an average of at least 1.3 succinic groups, and in one embodiment from about 1.3 to about 2.5, and in one embodiment about 1.5 to about 2.5, and in one embodiment from about 1.7 to about 2.1 succinic groups for each equivalent weight of the hydrocarbyl substituent. In one embodiment, the hydrocarbyl-substituted carboxylic acid acylating agent is characterized by the presence within its structure of about 1.0 to about 1.3, and in one embodiment about 1.0 to about 1.2, and in one embodiment from about 1.0 to about 1.1 succinic groups for each equivalent weight of the hydrocarbyl substituent.

In one embodiment, the hydrocarbyl-substituted carboxylic acid acylating agent is a polyisobutene-substituted succinic anhydride, the polyisobutene substituent having a number average molecular weight of about 1,500 to about 3,000, and in one embodiment about 1,800 to about 2,300, said first polyisobutene-substituted succinic anhydride being characterized by about 1.3 to about 2.5, and in one embodiment about 1.7 to about 2.1 succinic groups per equivalent weight of the polyisobutene substituent.

In one embodiment, the hydrocarbyl-substituted carboxylic acid acylating agent is a polyisobutene-substituted succinic anhydride, the polyisobutene substituent having a number average molecular weight of about 700 to about 1300, and in one embodiment about 800 to about 1,000, said polyisobutene-substituted succinic anhydride being characterized by about 1.0 to about 1.3, and in one embodiment about 1.0 to about 1.2 succinic groups per equivalent weight of the polyisobutene substituent.

For purposes of this invention, the equivalent weight of the hydrocarbyl substituent group of the hydrocarbyl-substituted succinic acylating agent is deemed to be the number obtained by dividing the number average molecular weight ($M_n$) of the polyolefin from which the hydrocarbyl substituent is derived into the total weight of all the hydrocarbyl substituent groups present in the hydrocarbyl-substituted succinic acylating agents. Thus, if a hydrocarbyl-substituted acylating agent is characterized by a total weight of all hydrocarbyl substituents of 40,000 and the $M_n$ value for the polyolefin from which the hydrocarbyl substituent groups are derived is 2000, then that substituted succinic acylating agent is characterized by a total of 20 (40,000/2000=20) equivalent weights of substituent groups.

The ratio of succinic groups to equivalent of substituent groups present in the hydrocarbyl-substituted succinic acylating agent (also called the "succination ratio") can be determined by one skilled in the art using conventional techniques (such as from saponification or acid numbers). For example, the formula below can be used to calculate the succination ratio where maleic anhydride is used in the acylation process:

$$SR = \frac{M_n \times (\text{Sap. No. of acylating agent})}{(56100 \times 2) - (98 \times \text{Sap. No. of acylating agent})}$$

In this equation, SR is the succination ratio, $M_n$ is the number average molecular weight, and Sap. No. is the saponification number. In the above equation, Sap. No. of acylating agent=measured Sap. No. of the final reaction mixture/AI wherein AI is the active ingredient content expressed as a number between 0 and 1, but not equal to zero. Thus an active ingredient content of 80% corresponds to an AI value of 0.8. The AI value can be calculated by using techniques such as column chromatography, which can be used to determine the amount of unreacted polyalkene in the final reaction mixture. As a rough approximation, the value of AI is determined after subtracting the percentage of unreacted polyalkene from 100 and divide by 100.

The fuel-soluble product (i) may be formed using ammonia, an amine and/or metals such as Na, K, Ca, and the like. The amines useful for reacting with the acylating agent to form the product (i) include monoamines, polyamines, and mixtures thereof.

The monoamines have only one amine functionality whereas the polyamines have two or more. The amines may be primary, secondary or tertiary amines. The primary amines are characterized by the presence of at least one —NH$_2$ group; the secondary by the presence of at least one H—N<group. The tertiary amines are analogous to the primary and secondary amines with the exception that the hydrogen atoms in the —NH$_2$ or H—N<groups are replaced by hydrocarbyl groups. Examples of primary and secondary monoamines include ethylamine, diethylamine, n-butylamine, di-n-butylamine, allylamine, isobutylamine, cocoamine, stearylamine, laurylamine, methyllaurylamine, oleylamine, N-methyloctylamine, dodecylamine, and octadecylamine. Suitable examples of tertiary monoamines include trimethylamine, triethylamine, tripropylamine, tributylamine, monomethyldimethylamine, monoethyldimethylamine, dimethylpropylamine, dimethylbutylamine, dimethylpentylamine, dimethylhexylamine, dimethylheptylamine, and dimethyloctylamine.

The amine may be a hydroxyamine. The hydroxyamine may be a primary, secondary or tertiary amine. Typically, the hydroxamines are primary, secondary or tertiary alkanol amines.

The alkanol amines may be represented by the formulae:

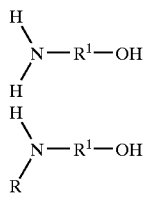

-continued

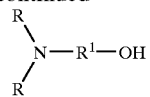

wherein in the above formulae each R is independently a hydrocarbyl group of 1 to about 8 carbon atoms, or a hydroxy-substituted hydrocarbyl group of 2 to about 8 carbon atoms and each R' independently is a hydrocarbylene (i.e., a divalent hydrocarbon) group of 2 to about 18 carbon atoms. The group —R'—OH in such formulae represents the hydroxy-substituted hydrocarbylene group. R' may be an acyclic, alicyclic, or aromatic group. In one embodiment, R' is an acyclic straight or branched alkylene group such as ethylene, 1,2-propylene, 1,2-butylene, 1,2-octadecylene, etc. group. When two R groups are present in the same molecule they may be joined by a direct carbon-to-carbon bond or through a heteroatom (e.g., oxygen, nitrogen or sulfur) to form a 5-, 6-, 7- or 8-membered ring structure. Examples of such heterocyclic amines include N-(hydroxy lower alkyl)-morpholines, -thiomorpholines, -piperidines, -oxazolidines, -thiazolidines and the like. Typically, however, each R is independently a lower alkyl group of up to seven carbon atoms.

Suitable examples of the above hydroxyamines include mono-, di-, and triethanolamine, dimethylethanol amine, diethylethanol amine, di-(3-hydroxypropyl)amine, N-(3-hydroxybutyl)amine, N-(4-hydroxy butyl)amine, and N,N-di-(2-hydroxypropyl)amine.

The amine may be an alkylene polyamine. Especially useful are the alkylene polyamines represented by the formula:

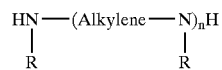

wherein n has an average value between 1 and about 10, and in one embodiment about 2 to about 7, the "Alkylene" group has from 1 to about 10 carbon atoms, and in one embodiment about 2 to about 6 carbon atoms, and each R is independently hydrogen, an aliphatic or hydroxy-substituted aliphatic group of up to about 30 carbon atoms. These alkylene polyamines include methylene polyamines, ethylene polyamines, butylene polyamines, propylene polyamines, pentylene polyamines, etc. Specific examples of such polyamines include ethylene diamine, diethylene triamine, triethylene tetramine, propylene diamine, trimethylene diamine, tripropylene tetramine, tetraethylene pentamine, hexaethylene heptamine, pentaethylene hexamine, or a mixture of two or more thereof.

Ethylene polyamines are useful. These are described in detail under the heading Ethylene Amines in Kirk Othmer's "Encyclopedia of Chemical Technology", 2d Edition, Vol. 7, pages 22–37, Interscience Publishers, New York (1965). These polyamines may be prepared by the reaction of ethylene dichloride with ammonia or by reaction of an ethylene imine with a ring opening reagent such as water, ammonia, etc. These reactions result in the production of a complex mixture of polyalkylene polyamines including cyclic condensation products such as piperazines.

In one embodiment, the amine is a polyamine bottoms or a heavy polyamine. The term "polyamine bottoms" refers to those polyamines resulting from the stripping of a polyamine mixture to remove lower molecular weight polyamines and volatile components to leave, as residue, the polyamine bottoms. In one embodiment, the polyamine bottoms are characterized as having less than about 2% by weight total diethylene triamine or triethylene tetramine. A useful polyamine bottoms is available from Dow Chemical under the trade designation E-100. This material is described as having a specific gravity at 15.6° C. of 1.0168, a nitrogen content of 33.15% by weight, and a viscosity at 40° C. of 121 centistokes. Another polyamine bottoms that may be used is commercially available from Union Carbide under the trade designation HPA-X. This polyamine bottoms product contains cyclic condensation products such as piperazine and higher analogs of diethylene triamine, triethylene tetramine, and the like.

The term "heavy polyamine" refers to polyamines that contain seven or more nitrogen atoms per molecule, or polyamine oligomers containing seven or more nitrogens per molecule, and two or more primary amines per molecule. These are described in European Patent No. EP 0770098, which is incorporated herein by reference for its disclosure of such heavy polyamines.

The fuel-soluble product (i) may be a salt, an ester, an ester/salt, an amide, an imide, or a combination of two or more thereof. The salt may be an internal salt involving residues of a molecule of the acylating agent and the ammonia or amine wherein one of the carboxyl groups becomes ionically bound to a nitrogen atom within the same group; or it may be an external salt wherein the ionic salt group is formed with a nitrogen atom that is not part of the same molecule. In one embodiment, the amine is a hydroxyamine, the hydrocarbyl-substituted carboxylic acid acylating agent is a hydrocarbyl-substituted succinic anhydride, and the resulting fuel-soluble product is a half ester and half salt, i.e., an ester/salt. In one embodiment, the amine is an alkylene polyamine, the hydrocarbyl-substituted carboxylic acid acylating agent is a hydrocarbyl-substituted succinic anhydride, and the resulting fuel-soluble product is a succinimide.

The reaction between the hydrocarbyl-substituted carboxylic acid acylating agent and the ammonia or amine is carried out under conditions that provide for the formation of the desired product. Typically, the hydrocarbyl-substituted carboxylic acid acylating agent and the ammonia or amine are mixed together and heated to a temperature in the range of from about 50° C. to about 250° C., and in one embodiment from about 80° C. to about 200° C.; optionally in the presence of a normally liquid, substantially inert organic liquid solvent/diluent, until the desired product has formed. In one embodiment, the hydrocarbyl-substituted carboxylic acid acylating agent and the ammonia or amine are reacted in amounts sufficient to provide from about 0.3 to about 3 equivalents of hydrocarbyl-substituted carboxylic acid acylating agent per equivalent of ammonia or amine. In one embodiment, this ratio is from about 0.5:1 to about 2:1, and in one embodiment about 1:1.

In one embodiment, the fuel soluble product (i) comprises: (i)(a) a first fuel-soluble product made by reacting a first hydrocarbyl-substituted carboxylic acid acylating agent with ammonia or an amine, the hydrocarbyl substituent of said first acylating agent having about 50 to about 500 carbon atoms; and (i)(b) a second fuel-soluble product made by reacting a second hydrocarbyl-substituted carboxylic acid acylating agent with ammonia or an amine, the hydrocarbyl substituent of said second acylating agent having about 50 to about 500 carbon atoms. In this embodiment, the products (i)(a) and (i)(b) are different. For example, the molecular weight of the hydrocarbyl substituent for the first acylating agent may be different than the molecular weight of the hydrocarbyl substituent for the second acylating agent. In one embodiment, the number average molecular weight for the hydrocarbyl substituent for the first acylating agent may be in the range of about 1500 to about 3000, and in one embodiment about 1800 to about 2300, and the number average molecular weight for the hydrocarbyl substituent for the second acylating agent may be in the range of about 700 to about 1300, and in one embodiment about 800 to about 1000. The first hydrocarbyl-substituted carboxylic acid acylating agent may be a polyisobutene-substituted succinic anhydride, the polyisobutene substituent having a number average molecular weight of about 1,500 to about 3,000, and in one embodiment about 1,800 to about 2,300. This first polyisobutene-substituted succinic anhydride may be characterized by at least about 1.3, and in one embodiment about 1.3 to about 2.5, and in one embodiment about 1.7 to about 2.1 succinic groups per equivalent weight of the polyisobutene substituent. The amine used in this first fuel-soluble product (i)(a) may be an alkanol amine and the product may be in the form of an ester/salt. The second hydrocarbyl-substituted carboxylic acid acylating agent may be a polyisobutene-substituted succinic anhydride, the polyisobutene substituent of said second polyisobutene-substituted succinic anhydride having a number average molecular weight of about 700 to about 1,300, and in one embodiment about 800 to about 1,000. This second polyisobutene-substituted succinic anhydride may be characterized by about 1.0 to about 1.3, and in one embodiment about 1.0 to about 1.2 succinic groups per equivalent weight of the polyisobutene substituent. The amine used in this second fuel-soluble product (i)(b) may be an alkanol amine and the product may be in the form of an ester/salt, or the amine may be an alkylene polyamine and the product may be in the form of a succinimide. The fuel-soluble product (i) may be comprised of: about 1% to about 99% by weight, and in one embodiment about 30% to about 70% by weight of the product (i)(a); and about 99% to about 1% by weight, and in one embodiment about 70% to about 30% by weight of the product (i)(b).

In another embodiment, component (i) is a combination of (i)(a) at least one reaction product of an acylating agent with an alkanol amine and (i)(b) at least one reaction product of an acylating agent with at least one ethylene polyamine.

In this embodiment, component (i)(a) is a hydrocarbon fuel-soluble product made by reacting an acylating agent with alkanol amine, wherein said alkanol amine is preferably a dimethylethanol amine or a diethylethanolamine. Preferably, component (i)(a) is made from a polyisobutylene group having a number average molecular weight (Mn) range of from about 1500 to about 3000, and that is maleinated or succinated in the range from 1.3 up to 2.5.

In an embodiment component (i)(b) is a hydrocarbon fuel-soluble product made by reacting an acylating agent with at least one ethylene polyamine such as TEPA (tetraethylenepentamine), PEHA (pentaethylenehexaamine), TETA (triethylenetetramine), polyamine bottoms, or at least one heavy polyamine. The ethylene polyamine can be condensed to form a succinimide. In another embodiment the ethylene polyamine can form a succinimide, by carrying out an imidation reaction at temperatures in the range of about 60° C. to about 250° C.

The equivalent ratio of the reaction for CO:N is from 1:1.5 to 1:0.5, more preferably from 1:1.3 to 1:0.70, and most preferably from 1:1 to 1:0.70, wherein CO:N is the carbonyl to amine nitrogen ratio. Also, component (i)(b) is preferably made from a polyisobutylene group having a number average molecular weight of from about 700 to about 1300 and that is succinated in the range from 1.0 up to 1.3.

The polyamines useful in reacting with the acylating agent for component (i)(b) can be aliphatic, cycloaliphatic, heterocyclic or aromatic compounds. Especially useful are the alkylene polyamines represented by the formula:

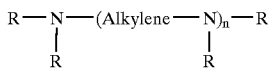

wherein n is from 1 to about 10, preferably from 1 to about 7; each R is independently a hydrogen atom, a hydrocarbyl group or a hydroxy-substituted hydrocarbyl group having up to about 700 carbon atoms, and in one embodiment up to about 100 carbon atoms, and in one embodiment up to about 50 carbon atoms, and in one embodiment up to about 30 carbon atoms; and the "Alkylene" group has from 1 to about 18 carbon atoms, and in one embodiment from 1 to about 6 carbon atoms.

Heavy polyamines typically result from stripping of polyamine mixtures, to remove lower molecular weight polyamines and volatile components, to leave, as residue, what is often termed "polyamine bottoms". In general, alkylene polyamine bottoms can be characterized as having less than 2%, usually less than 1% (by weight) material boiling below about 200° C. In the instance of ethylene polyamine bottoms, which are readily available and found to be quite useful, the bottoms contain less than about 2% (by weight) total diethylenetriamine (DETA) or triethylenetetramine (TETA), as set forth in U.S. Pat. No. 5,912,213, incorporated herein by reference in its entirety. A typical sample of such ethylene polyamine bottoms obtained from the Dow Chemical Company of Freeport, Tex., designated "E-100" has a specific gravity at 15.6° C. of 1.0168, a percent nitrogen by weight of 33.15 and a viscosity at 40° C. of 121 centistokes. Gas chromatography analysis of such a sample showed it contains about 0.93% "Light Ends" (most probably diethylenetriamine), 0.72% triethylene tetramine, 21.74% tetraethylenepentamine and 76.61% pentaethylenehexamine and higher (by weight). Another commercially available sample is from Union Carbide, known as HPA-X®. These alkylene polyamine bottoms include cyclic condensation products such as piperazine and higher analogs of diethylenetriamine, triethylenetetramine and the like.

The term "heavy polyamine" can also refer to a polyamine that contains 7 or more nitrogens per molecule, or polyamine oligomers containing 7 or more nitrogens per molecule and with 2 or more primary amines per molecule, for example, as set forth in European Patent No. EP 0770098, incorporated herein by reference in its entirety.

In another embodiment, both i(a) and i(b) can each made from a higher molecular weight polyisobutylene group (meaning Mn greater than or equal to about 1,500, preferably from about 1,500 to about 3,000). In an alternative embodiment, components i(a) and i(b) can each made from a lower molecular weight polyisobutylene group (meaning Mn less than or equal to about 1,300, preferably from about 700 to 1,300).

In another embodiment, component i(a) is made from a polyisobutylene group having a number average molecular weight range of from about 700 to about 1,300, and component i(b) is made from a polyisobutylene group having a Mn range of from about 1,500 to about 3,000.

Preferably, component (i)(b) is made by reacting a succinic acylating agent with a polyamine at a sufficient temperature to remove water and form a succinimide.

Preferably, component (i)(b) is combined with component (i)(a) in an amount from about 0.05% to about 0.95% based upon the total weight of component (i).

In another embodiment, the hydrocarbon fuel-soluble product (i) is a salt composition comprised of (I) a first polycarboxylic acylating agent, said first polycarboxylic acylating agent having at least one hydrocarbyl substituent of about 20 to about 500 carbon atoms, (II) a second polycarboxylic acylating agent, said second polycarboxylic acylating agent optionally having at least one hydrocarbyl substituent of up to about 500 carbon atoms, said polycarboxylic acylating agents (I) and (II) being coupled together by a linking group (III) derived from a linking compound having two or more primary amino groups, two or more secondary amino groups, at least one primary amino group and at least one secondary amino group, at least two hydroxyl groups, or at least one primary or secondary amino group and at least one hydroxyl groups, said polycarboxylic acylating agents (I) and (III) forming a salt with (IV) ammonia or an amine.

The hydrocarbyl substituent of the first acylating agent (I) may have about 30 to about 500 carbon atoms, and in one embodiment about 40 to about 500 carbon atoms, and in one embodiment about 50 to about 500 carbon atoms.

The optional hydrocarbyl substituent of the second acylating agent (II) may have 1 to about 500 carbon atoms, and in one embodiment about 6 to about 500 carbon atoms, and in one embodiment about 12 to about 500 carbon atoms, and in one embodiment about 18 to about 500 carbon atoms, and in one embodiment about 24 to about 500 carbon atoms, and in one embodiment about 30 to about 500 carbon atoms, and in one embodiment about 40 to about 500 carbon atoms, and in one embodiment about 50 to about 500 carbon atoms.

The hydrocarbyl substituent of the second acylating agent (II) may be derived from an alpha-olefin or an alpha-olefin fraction. The alpha-olefins include 1-dodecene, 1-tridecene, 1-tetradecene, 1-pentadecene, 1-hexadecene, 1-heptadecene, 1-octadecene, 1-eicosene, 1-docosene, 1-triacontene, and the like. The alpha olefin fractions that are useful include $C_{15-18}$ alpha-olefins, $C_{12-16}$ alpha-olefins, $C_{14-16}$ alpha-olefins, $C_{14-18}$ alpha-olefins, $C_{16-18}$ alpha-olefins, $C_{18-24}$ alpha-olefins, $C_{18-30}$ alpha-olefins, and the like. Mixtures of two or more of any of the foregoing alpha-olefins or alpha-olefin fractions may be used.

The hydrocarbyl groups of the first and second acylating agents (I) and (II) independently may be derived from an olefin oligomer or polymer. The olefin oligomer or polymer may be derived from an olefin monomer of 2 to about 10 carbon atoms, and in one embodiment about 3 to about 6 carbon atoms, and in one embodiment about 4 carbon atoms. Examples of the monomers include ethylene; propylene; butene-1; butene-2; isobutene; pentene-1; heptene-1; octene-1; nonene-1; decene-1; pentene-2; or a mixture of two of more thereof.

The hydrocarbyl groups of the first and/or second acylating agents (I) and (II) independently may be polyisobutene groups of the same or different molecular weights. Either or both of the polyisobutene groups may be made by the polymerization of a $C_4$ refinery stream having a butene content of about 35 to about 75% by weight and an isobutene content of about 30 to about 60% by weight.

The hydrocarbyl groups of the first and/or second acylating agents (I) and (II) independently may be polyisobutene groups derived from a polyisobutene having a high methylvinylidene isomer content, that is, at least about 50% by weight, and in one embodiment at least about 70% by weight methylvinylidenes. Suitable high methylvinylidene polyisobutenes include those prepared using boron trifluoride catalysts. The preparation of such polyisobutenes in which the methylvinylidene isomer comprises a high percentage of the total olefin composition is described in U.S. Pat. Nos. 4,152,499 and 4,605,808, the disclosure of each of which are incorporated herein by reference. An advantage of using these high methylvinylidene isomers is that the acylating agents (I) and (II) can be formed using a chlorine-free process which is significant when the fuel composition to which they are to be added is required to be a chlorine-free or low-chlorine fuel.

In one embodiment, each of the hydrocarbyl substituents of each of the acylating agents (I) and (II) is a polyisobutene group, and each polyisobutene group independently has a number average molecular weight in the range of about 500 to about 3000, and in one embodiment about 900 to about 2400.

The hydrocarbyl substituent of the acylating agent (I) may be a polyisobutene group having a number average molecular weight of about 2,000 to about 2,600, and in one embodiment about 2,200 to about 2,400, and in one embodiment about 2,300. The hydrocarbyl substituent of the acylating agent (II) may be a polyisobutene group having a number average molecular weight of about 700 to about 1,300, and in one embodiment about 900 to about 1,100, and in one embodiment about 1,000.

The linking group (III) for linking the first acylating agent (I) with the second acylating agent (II) may be derived from a polyol, a polyamine or a hydroxyamine. The polyol may be a compound represented by the formula:

wherein in the foregoing formula, R is an organic group having a valency of m, R is joined to the OH groups through carbon-to-oxygen bonds, and m is an integer from 2 to about 10, and in one embodiment 2 to about 6. The polyol may be a glycol. The alkylene glycols are useful. Examples of the polyols that may be used include ethylene glycol, diethylene glycol, triethylene glycol, tetraethylene glycol, propylene glycol, dipropylene glycol, tripropylene glycol, dibutylene glycol, tributylene glycol, 1,2-butanediol, 2,3-dimethyl-2,3-butanediol, 2,3-hexanediol, 1,2-cyclohexanediol, pentaerythritol, dipentaerythritol, 1,7-heptanediol, 2,4-heptanediol, 1,2,3-hexanetriol, 1,2,4-hexanetriol, 1,2,5-hexanetriol, 2,3,4-hexanetriol, 1,2,3-butanetriol, 1,2,4-butanetriol, 2,2,6,6-tetrakis-(hydroxymethyl)cyclohexanol, 1,10-decanediol, digitalose, 2-hydroxymethyl-2-methyl-1,3-propanediol-(tri-methylethane), or 2-hydroxymethyl-2-ethyl-1,3-propanediol-(trimethylpropane), and the like. Mixtures of two or more of the foregoing can be used.

The polyamines useful as linking compounds (III) for linking the acylating agents (I) and (II) may be aliphatic, cycloaliphatic, heterocyclic or aromatic compounds. Especially useful are the alkylene polyamines represented by the formula:

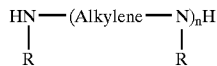

wherein n has an average value between 1 and about 10, and in one embodiment about 2 to about 7, the "Alkylene" group has from 1 to about 10 carbon atoms, and in one embodiment about 2 to about 6 carbon atoms, and each R is independently hydrogen, an aliphatic or hydroxy-substituted aliphatic group of up to about 30 carbon atoms. These alkylene polyamines include methylene polyamines, ethylene polyamines, butylene polyamines, propylene polyamines, pentylene polyamines, etc. Specific examples of such polyamines include ethylene diamine, triethylene tetramine, propylene diamine, trimethylene diamine, tripropylene tetramine, tetraethylene pentamine, hexaethylene heptamine, pentaethylene hexamine, or a mixture of two or more thereof.

Ethylene polyamines, such as some of those mentioned above, are useful as the linking compounds (III). Such polyamines are described in detail under the heading Ethylene Amines in Kirk Othmer's "Encyclopedia of Chemical Technology", 2d Edition, Vol. 7, pages 22–37, Interscience Publishers, New York (1965). Such polyamines are most conveniently prepared by the reaction of ethylene dichloride with ammonia or by reaction of an ethylene imine with a ring-opening reagent such as water, ammonia, etc. These reactions result in the production of a complex mixture of polyalkylene polyamines including cyclic condensation products such as piperazines.

The hydroxyamines useful as linking compounds (III) for linking the acylating agents (I) and (II) may be primary or secondary amines. The terms "hydroxyamine" and "aminoalcohol" describe the same class of compounds and, therefore, can be used interchangeably. In one embodiment, the hydroxyamine is (a) an N-(hydroxyl-substituted hydrocarbyl)amine, (b) a hydroxyl-substituted poly (hydrocarbyloxy) analog of (a), or a mixture of (a) and (b). The hydroxyamine may be an alkanol amine containing from 1 to about 40 carbon atoms, and in one embodiment 1 to about 20 carbon atoms, and in one embodiment 1 to about 10 carbon atoms.

The hydroxyamines useful as the linking compounds (III) may be a primary or secondary amines, or a mixture of two or more thereof. These hydroxyamines may be represented, respectfully, by the formulae:

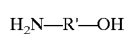

or

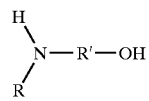

wherein each R is independently a hydrocarbyl group of one to about eight carbon atoms or hydroxyl-substituted hydrocarbyl group of two to about eight carbon atoms and R' is a divalent hydrocarbon group of about two to about 18 carbon atoms. Typically each R is a lower alkyl group of up to seven carbon atoms. The group —R'—OH in such formulae represents the hydroxyl-substituted hydrocarbyl group. R' can be an acyclic, alicyclic or aromatic group. Typically, R' is an acyclic straight or branched alkylene group such as an ethylene, 1,2-propylene, 1,2-butylene, 1,2-octadecylene, etc. group.

The hydroxyamines useful as the linking compound (III) may be ether N-(hydroxy-substituted hydrocarbyl) amines. These may be hydroxyl-substituted poly(hydrocarbyloxy) analogs of the above-described hydroxyamines (these analogs also include hydroxyl-substituted oxyalkylene analogs). Such N-(hydroxyl-substituted hydrocarbyl) amines may be conveniently prepared by reaction of epoxides with afore-described amines and may be represented by the formulae:

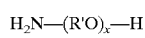

or

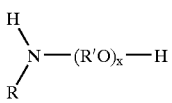

wherein x is a number from about 2 to about 15, and R and R' are as described above.

The hydroxyamine useful as the linking compound (III) for linking the acylating agents (I) and (II) may be one of the hydroxy-substituted primary amines described in U.S. Pat. No. 3,576,743 by the general formula:

wherein $R_a$ is a monovalent organic group containing at least one alcoholic hydroxy group. The total number of carbon atoms in $R_a$ preferably does not exceed about 20. Hydroxy-substituted aliphatic primary amines containing a total of up to about 10 carbon atoms are useful. The polyhydroxy-substituted alkanol primary amines wherein there is only one amino group present (i.e., a primary amino group) having one alkyl substituent containing up to about 10 carbon atoms and up to about 6 hydroxyl groups are useful. These alkanol primary amines correspond to $R_a$—$NH_2$ wherein $R_a$ is a mono-O or polyhydroxy-substituted alkyl group. It is desirable that at least one of the hydroxyl groups be a primary alcoholic hydroxyl group. Specific examples of the hydroxy-substituted primary amines include 2-amino-1-butanol, 2-amino-methyl-1-propanol, p-(beta-hydroxyethyl)-aniline, 2-amino-1-propanol, 3-amino-1-propanol,2-amino-2-methyl-1,3-propanediol, 2-amino-2-ethyl-1,3-propanediol, N-(beta-hydroxypropyl)-N'-(beta-aminoethyl)-piperazine, tris-(hydroxymethyl) aminomethane (also known as trismethylolaminomethane), 2-amino-butanol, ethanolamine, beta-(beta-hydroxyethoxy)-ethylamine, glucamine, glusoamine, 4-amino-3-hydroxy-3-methyl-1-butene (that can be prepared according to procedures known in the art by reacting isopreneoxide with ammonia), N-3 (aminopropyl)-4-(2-hydroxyethyl)-piperadine, 2-amino-6-methyl-6-heptanol, 5-amino-1-pentanol, N-(beta-hydroxyethyl)-1,3-diamino propane, 1,3-diamino-2-hydroxypropane, N-(beta-hydroxy ethoxyethyl)-ethylenediamine, trismethylol aminomethane and the like.

Hydroxyalkyl alkylene polyamines having one or more hydroxyalkyl substituents on the nitrogen atoms may be used as the linking compound (III) for linking the acylating agents (I) and (II). Useful hydroxyalkyl-substituted alkylene polyamines include those in which the hydroxyalkyl group is a lower hydroxyalkyl group, i.e., having less than eight carbon atoms. Examples of such hydroxyalkyl-substituted polyamines include N-(2-hydroxyethyl) ethylene diamine, N,N-bis(2-hydroxyethyl) ethylene diamine, 1-(2-hydroxyethyl)-piperazine, monohydroxypropyl-substituted diethylene triamine, dihydroxypropyl-substituted tetraethylene pentamine, N-(3-hydroxybutyl) tetramethylene diamine, etc. Higher homologs as are obtained by condensation of the above-illustrated hydroxy alkylene polyamines through amino groups or through hydroxy groups are likewise useful. Condensation through amino groups results in a higher amine accompanied by removal of ammonia and condensation through the hydroxy groups results in products containing ether linkages accompanied by removal of water.

The amines (IV) which are useful along with ammonia in forming a salt with the acylating agents (I) and (II) include the amines and hydroxyamines discussed above as being useful as linking compounds (III) for linking the acylating agents (I) and (II). Also included are primary and secondary monoamines, tertiary mono- and polyamines, and tertiary alkanol amines. The tertiary amines are analogous to the primary amines, secondary amines and hydroxyamines discussed above with the exception that they may be either monoamines or polyamines and the hydrogen atoms in the H—N< or —$NH_2$ groups are replaced by hydrocarbyl groups.

The monoamines useful as the amines (IV) for forming a salt with the acylating agents (I) and (II) may be represented by the formula:

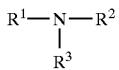

wherein $R^1$, $R^2$ and $R^3$ are the same or different hydrocarbyl groups. Preferably, $R^1$, $R^2$ and $R^3$ are independently hydrocarbyl groups of from 1 to about 20 carbon atoms, and in one embodiment from 1 to about 10 carbon atoms. Examples of useful tertiary amines include trimethylamine, triethyl amine, tripropylamine, tributylamine, monomethyldiethylamine, monoethyldimethylamine, dimethylpropylamine, dimethylbutylamine, dimethylpentylamine, dimethylhexylamine, dimethylheptylamine, dimethyloctyl amine, dimethylnonylamine, dimethyldecylamine, dimethylphenylamine, N,N-dioctyl-1-octanamine, N,N-didodecyl-1-dodecanamine, tricocoamine, trihydrogenated-tallowamine, N-methyl-dihydrogenated-tallowamine, N,N-dimethyl-1-dodecanamine, N,N-dimetyl-1-tetradecanamine, N,N-dimethyl-1-hexadecanamine, N,N-dimethyl 1-octadecanamine, N,N-dimethylcocoamine, N,N-dimethylsoyaamine, N,N-dimethylhydrogenated-tallowamine, etc.

Tertiary alkanol amines which are useful as the amines (IV) for forming a salt with the acylating agents (I) and (II) include those represented by the formula:

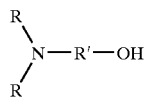

wherein each R is independently a hydrocarbyl group of one to about eight carbon atoms or hydroxyl-substituted hydrocarbyl group of two to about eight carbon atoms and R' is a divalent hydrocarbyl group of about two to about 18 carbon atoms. The groups —R'—OH in such formula represents the hydroxyl-substituted hydrocarbyl groups. R' may be an acyclic, alicyclic or aromatic group. Typically, R' is an acyclic straight or branched alkylene group such as an ethylene, 1,2-propylene, 1,2-butylene, 1,2-octadecylene, etc. group. Where two R groups are present in the same molecule they can be joined by a direct carbon-to-carbon bond or through a heteroatom (e.g., oxygen, nitrogen or sulfur) to form a 5-, 6-, 7- or 8-membered ring structure. Examples of such heterocyclic amines include N-(hydroxyl lower alkyl)-morpholines, -thiomorpholines, -piperidines, -oxazolidines, -thiazolidines, and the like. Typically, however, each R is a low alkyl group of up to seven carbon atoms. A useful hydroxyamine is dimethylaminoethanol. The hydroxyamines can also be ether N-(hydroxy-substituted hydrocarbyl) amines. These are hydroxyl-substituted poly(hydrocarbyloxy) analogs of the above-described hydroxy amines (these analogs also include hydroxyl-substituted oxyalkylene analogs). Such N-(hydroxyl-substituted hydrocarbyl) amines can be conveniently prepared by reaction of epoxides with afore-described amines and can be represented by the formula:

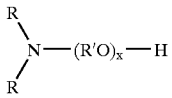

wherein x is a number from about 2 to about 15 and R and R' are described above.

Polyamines which are useful as the amines (IV) for forming a salt with the acylating agents (I) and (II) include the alkylene polyamines discussed above as well as alkylene polyamines with only one or no hydrogens attached to the nitrogen atoms. Thus, the alkylene polyamines useful as the amine (IV) include those conforming to the formula:

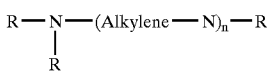

wherein n is from 1 to about 10, preferably from 1 to about 7; each R is independently a hydrogen atom, a hydrocarbyl group or a hydroxy-substituted hydrocarbyl group having up to about 700 carbon atoms, and in one embodiment up to about 100 carbon atoms, and in one embodiment up to about 50 carbon atoms, and in one embodiment up to about 30 carbon atoms; and the "Alkylene" group has from 1 to about 18 carbon atoms, and in one embodiment from 1 to about 6 carbon atoms.

These hydrocarbon fuel-soluble salt compositions may be prepared by initially reacting the acylating agents (I) and (II) with the linking compound (III) to form an intermediate, and thereafter reacting the intermediate with the ammonia or amine (IV) to form the desired salt. An alternative method involves reacting the acylating agent (I) and ammonia or amine (IV) with each other to form a first salt moiety, separately reacting the acylating agent (II) and ammonia or amine (IV) (which can be the same or different ammonia or amine reacted with the acylating agent (I)) with each other to form a second salt moiety, then reacting a mixture of these two salt moieties with the linking compound (III).

The ratio of reactants utilized in the preparation of these salt compositions may be varied over a wide range. Generally, for each equivalent of each of the acylating agents (I) and (II), at least about one equivalent of the linking compound (III) is used. From about 0.1 to about 2 equivalents or more of ammonia or amine (IV) are used for each equivalent of the acylating agents (I) and (II), respectively. The upper limit of linking compound (III) is about 2 equivalents of linking compound (III) for each equivalent of acylating agents (I) and (II). Generally the ratio of equivalents of acylating agent (I) to the acylating agent (II) is about 0.5 to about 2, with about 1:1 being useful. Useful amounts of the reactants include about 2 equivalents of the linking compound (III), and from about 0.1 to about 2 equivalents of the ammonia or amine (IV) for each equivalent of each of the acylating agents (I) and (I).

The number of equivalents of the acylating agents (I) and (II) depends on the total number of carboxylic functions present in each. In determining the number of equivalents for each of the acylating agents (I) and (II), those carboxyl functions which are not capable of reacting as a carboxylic acid acylating agent are excluded. In general, however, there is one equivalent of each acylating agent (I) and (II) for each carboxy group in the acylating agents. For example, there would be two equivalents in an anhydride derived from the reaction of one mole of olefin polymer and one mole of maleic anhydride.

The weight of an equivalent of a polyamine is the molecular weight of the polyamine divided by the total number of nitrogens present in the molecule. If the polyamine is to be used as linking compound (III), tertiary amino groups are not counted. One the other hand, if the polyamine is to used as a salt forming amine (IV), tertiary amino groups are counted. The weight of an equivalent of a commercially available mixture of polyamines can be determined by dividing the atomic weight of nitrogen (14) by the % N contained in the polyamine; thus, a polyamine mixture having a % N of 34 would have an equivalent weight of 41.2. The weight of an equivalent of ammonia or a monoamine is equal to its molecular weight.

The weight of an equivalent of a polyol is its molecular weight divided by the total number of hydroxyl groups present in the molecule. Thus, the weight of an equivalent of ethylene glycol is one-half its molecular weight.

The weight of an equivalent of a hydroxyamine which is to be used as a linking compound (III) is equal to its molecular weight divided by the total number of —OH, >NH and —NH$_2$ groups present in the molecule. On the other hand, if the hydroxyamine is to be used as a salt forming amine (IV), the weight of an equivalent thereof would be its molecular weight divided by the total number of nitrogen groups present in the molecule.

The acylating agents (I) and (II) may be reacted with the linking compound (III) according to conventional ester and/or amide-forming techniques. This normally involves heating acylating agents (I) and (II) with the linking compound (III), optionally in the presence of a normally liquid, substantially inert, organic liquid solvent/diluent. Temperatures of at least about 30° C. up to the decomposition temperature of the reaction component and/or product having the lowest such temperature can be used. This temperature may be in the range of about 50° C. to about 130° C., and in one embodiment about 80° C. to about 100° C. when the acylating agents (I) and (II) are anhydrides. On the other hand, when the acylating agents (I) and (II) are acids, this temperature is typically in the range of about 100° C. to about 300° C. with temperatures in the range of about 125° C. to about 250° C. often being employed.

The product made by this reaction is typically in the form of statistical mixture that is dependent on the charge of each of the acylating agents (I) and (II), and on the number of reactive sites on the linking compound (III). For example, if an equal molar ratio of acylating agents (I) and (II) is reacted with ethylene glycol, the product would be comprised of a mixture of (1) 50% of compounds wherein one molecule the acylating agent (I) is linked to one molecule of the acylating agent (II) through the ethylene glycol; (2) 25% of compounds wherein two molecules of the acylating agent (I) are linked together through the ethylene glycol; and (3) 25% of compounds wherein two molecules of the acylating agent (II) are linked together through the ethylene glycol.

The reactions between the acylating agents (I) and (II), and the salt forming ammonia or amine (IV) are carried out under salt forming conditions using conventional techniques. Typically, these components are mixed together and heated to a temperature in the range of about 20° C. up to the decomposition temperature of the reaction component and/ or product having the lowest such temperature, and in one embodiment about 50° C. to about 130° C., and in one embodiment about 80° C. to about 110° C.; optionally, in the presence of a normally liquid, substantially inert organic liquid solvent/diluent, until the desired salt product has formed.

The fuel-soluble product (i) may be present in the water-fuel emulsion at a concentration of up to about 15% by weight based on the overall weight of the emulsion, and in one embodiment about 0.1 to about 15% by weight, and an one embodiment about 0.1 to about 10% by weight, and in one embodiment about 0.1 to about 5% by weight, and in one embodiment about 0.1 to about 2% by weight, and in one embodiment about 0.1 to about 1% by weight, and in one embodiment about 0.1 to about 0.7% by weight.

The Ionic or Nonionic Compound (ii)

The ionic or nonionic compound (ii) has a hydrophilic-lipophilic balance (HLB, which refers to the size and strength of the polar (hydrophilic) and non-polar (lipophilic) groups on the surfactant molecule) in the range of about 1 to about 40, and in one embodiment about 4 to about 15. Examples of these compounds are disclosed in *McCutcheon's Emulsifiers and Detergents*, 1998, North American & International Edition. Pages 1–235 of the North American Edition and pages 1–199 of the International Edition are incorporated herein by reference for their disclosure of such ionic and nonionic compounds having an HLB in the range of about 1 to about 40, in one embodiment about 1 to about 30, in one embodiment about 1 to 20, and in another embodiment about 1 to about 10. Useful compounds include alkanolamides, carboxylates including amine salts, metallic salts and the like, alkylarylsulfonates, amine oxides, poly (oxyalkylene) compounds, including block copolymers comprising alkylene oxide repeat units, carboxylated alcohol ethoxylates, ethoxylated alcohols, ethoxylated alkyl phenols, ethoxylated amines and amides, ethoxylated fatty acids, ethoxylated fatty esters and oils, fatty esters, fatty acid amides, including but not limited to amides from tall oil fatty acids and polyamides (3066), glycerol esters, glycol esters, sorbitan esters, imidazoline derivatives, lecithin and derivatives, lignin and derivatives, monoglycerides and derivatives, olefin sulfonates, phosphate esters and derivatives, propoxylated and ethoxylated fatty acids or alcohols or alkyl phenols, sorbitan derivatives, sucrose esters and derivatives, sulfates or alcohols or ethoxylated alcohols or fatty esters, sulfonates of dodecyl and tridecyl benzenes or condensed naphthalenes or petroleum, sulfosuccinates and derivatives, and tridecyl and dodecyl benzene sulfonic acids.

In one embodiment, the ionic or nonionic compound (ii) is a fuel-soluble product made by reacting an acylating agent having about 12 to about 30 carbon atoms with ammonia or an amine. The acylating agent may contain about 12 to about 24 carbon atoms, and in one embodiment about 12 to about 18 carbon atoms. The acylating agent may be a carboxylic acid or a reactive equivalent thereof. The reactive equivalents include acid halides, anhydrides, esters, and the like. These acylating agents may be monobasic acids or polybasic acids. The polybasic acids are preferably dicarboxylic, although tri- and tetra-carboxylic acids may be used. These acylating agents may be fatty acids. Examples include myristic acid, palmitic acid, stearic acid, oleic acid, linoleic acid, linolenic acid, and the like. These acylating agents may be succinic acids or anhydrides represented, respectively, by the formulae:

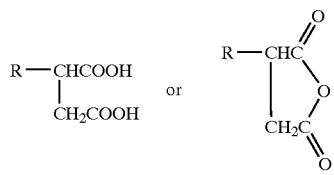

wherein each of the foregoing formulae R is a hydrocarbyl group of about 10 to about 28 carbon atoms, and in one embodiment about 12 to about 20 carbon atoms. Examples include tetrapropylene-substituted succinic acid or anhydride, hexadecyl succinic acid or anhydride, and the like. The amine may be any of the amines described above as being useful in making the fuel-soluble product (i). The amines include but are not limited to the reaction product between the fatty acid and the amine. The fatty acid includes but is not limited to tall oil fatty acid which is a mixture of $C_{12}$–$C_{20}$ fatty acids, the majority of which are unsaturated, more particularly linoleic acid, oleic acid, linolenic acid and the like. The amines include but are not limited to polyamines, such as heavy polyamine aromatic polyamines such as 3-amino-pyridine, N-13-aminopropyl imidazole and the like.

The product of the reaction between the acylating agent and the ammonia or amine may be a salt, an ester, an amide, an imide, or a combination thereof. The salt may be an internal salt involving residues of a molecule of the acylating agent and the ammonia or amine wherein one of the carboxyl groups becomes ionically bound to a nitrogen atom within the same group; or it may be an external salt wherein the ionic salt group is formed with a nitrogen atom that is not part of the same molecule. The reaction between the acylating agent and the ammonia or amine is carried out under conditions that provide for the formation of the desired product. Typically, the acylating agent and the ammonia or amine are mixed together and heated to a temperature in the range of from about 50° C. to about 250° C., and in one embodiment from about 80° C. to about 200° C.; optionally in the presence of a normally liquid, substantially inert organic liquid solvent/diluent, until the desired product has formed. In one embodiment, the acylating agent and the ammonia or amine are reacted in amounts sufficient to provide from about 0.3 to about 3 equivalents of acylating agent per equivalent of ammonia or amine. In one embodiment, this ratio is from about 0.5:1 to about 2:1, and in one embodiment about 1:1.

In one embodiment, the ionic or nonionic compound (ii) is an ester/salt made by reacting hexadecyl succinic anhydride with dimethylethanol amine in an equivalent ratio (i.e., carbonyl to amine ratio) of about 1:1 to about 1:1.5, and in one embodiment about 1:1.35.

The ionic or nonionic compound (ii) may be present in the water fuel emulsion at a concentration of up to about 15% by weight, and in one embodiment about 0.01 to about 15% by weight, and in one embodiment about 0.01 to about 10% by weight, and one embodiment about 0.01 to about 5% by weight, and in one embodiment about 0.01 to about 3% by weight, and in one embodiment about 0.1 to about 1% by weight.

The Water-Soluble Compound (iv)

The water-soluble compound may be an amine salt, ammonium salt, azide compound, nitro compound, alkali metal salt, alkaline earth metal salt, or mixtures of two or more thereof. These compounds are distinct from the fuel-soluble product (i) and the ionic or nonionic compound (ii) discussed above. These water-soluble compounds include organic amine nitrates, nitrate esters, azides, nitramines and nitro compounds. Also included are alkali and alkaline earth metal carbonates, sulfates, sulfides, sulfonates, and the like.

Particularly useful are the amine or ammonium salts represented by the formula:

$$k[G(NR_3)_y]^{p+} nX^{p-}$$

wherein G is hydrogen or an organic group of 1 to about 8 carbon atoms, and in one embodiment 1 to about 2 carbon atoms, having a valence of y; each R independently is hydrogen or a hydrocarbyl group of 1 to about 10 carbon atoms, and in one embodiment 1 to about 5 carbon atoms, and in one embodiment 1 to about 2 carbon atoms; $X^{p-}$ is an anion having a valence of p; and k, y, n and p are independently integers of at least 1. When G is H, y is 1. The sum of the positive charge $ky^+$ is equal to the sum of the negative charge $nX^{p-}$. In one embodiment, X is a nitrate ion; and in one embodiment it is an acetate ion. Examples include ammonium nitrate, ammonium acetate, methylammonium nitrate, methylammonium acetate, ethylene diamine diacetate, urea nitrate, urea and guanidinium nitrate. Ammonium nitrate is particularly useful.

In one embodiment, the water-soluble compound functions as an emulsion stabilizer, i.e., it acts to stabilize the water-fuel emulsion. Thus, in one embodiment, the water-soluble compound is present in the water fuel emulsion in an emulsion-stabilizing amount. In one embodiment, the water-soluble compound functions as a combustion improver. A combustion improver is characterized by its ability to increase the mass burning rate of the fuel composition. The presence of such a combustion improver has the effect of improving the power output of an engine. Thus, in one embodiment, the water-soluble compound is present in the water-fuel emulsion in a combustion-improving amount.

The water-soluble compound may be present in the water-fuel emulsion at a concentration of about 0.001 to about 1% by weight, and in one embodiment from about 0.01 to about 1% by weight.

Emulsifier (v)

In one embodiment the emulsifier (v) is the reaction product of A.) a polyacidic polymer with B.) at least one fuel soluble product made by reacting at least one hydrocarbyl-substituted carboxylic acid acylating agent with ammonia, an amine or a polyamine.

The fuel soluble product is made by reacting at least one hydrocarbyl-substituted carboxylic agent with ammonia, an amine or polyamine and is described earlier in the specification.

The polyacidic polymers used in the reaction include but are not limited to C4 to C30, preferably $C_8$ to $C_{20}$ olefin/maleic anhydride copolymers. The alpha-olefins include 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-eicosene, 1-docosene, 1-triacontene, and the like. The alpha olefin fractions that are useful include $C_{15-18}$ alpha-olefins, $C_{12-16}$ alpha-olefins, $C_{14-16}$ alpha-olefins, $C_{14-18}$ alpha-olefins, $C_{16-18}$ alpha-olefins, $C_{18-24}$ alpha-olefins, $C_{18-30}$ alpha-olefins, and the like. Mixtures of two or more of any of the foregoing alpha-olefins or alpha-olefin fractions may be used.

Other polyacidic polymers suitable for reaction include but are not limited to maleic anhydride/styrene copolymers; poly-maleic anhydride; acrylic and methacrylic acid containing polymers; poly-(alkyl)acrylates; reaction products of maleic anhydride with polymers with multiple double bonds; and combinations thereof. The preferred is polyacidic polymer $C_{18}$ [1-octadecene]/maleic anhydride copolymer.

In another embodiment the polyacidic polymer is a copolymer of an olefin and a monomer having the structure:

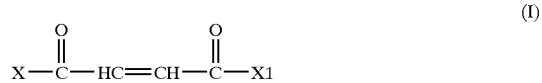

(I)

wherein X and X1 are the same or different provided that at least one of X and X1 is such that the copolymer can function as a carboxylic acylating agent. The copolymer of an olefin and a monomer having the structure is produced by copolymerization of olefin and monomer having the structure I. The olefin:monomer molar ratio in the copolymer is preferably 1:2 to 2:1, more preferable about 1:1.

As regards the olefin, this may be any polymerizable olefin characterized by the presence of one or more ethylenically unsaturated groups. The olefin may be either a terminal olefin or an internal olefin, preferably a terminal olefin. Although it is preferred to employ olefinic hydrocarbons, the olefin may contain nonhydrocarbon groups, for example, alkoxy or hydroxy groups. Examples of suitable olefin monomers include but are not limited to 1-hexene, octadecene-1 and diisobutylene. The olefin preferably is a $C_4$–$C_{30}$ olefin.

As regards the monomer having the structure (I), at least one and preferably both X and X1 must be such that the copolymer can esterify alcohols, form amides or amine salts with ammonia or amines, form metal salts with reactive metals or basically reacting metal compounds, and otherwise function as a conventional carboxylic acid acylating agent. Thus X and/or X1 can be —OH, —O-hydrocarbyl, —NH2, —Cl., Br. or together can be an oxygen atom so as to form the anhydride. Preferably X and/or X1 are either —OY or together are an oxygen atom, more preferably X and X1 are together an oxygen atom, i.e., the monomer having the structure (I) is maleic anhydride.

A range of suitable olefin/monomer copolymers wherein the monomers have the structure (I) are commercially available, include but are not limited to (a) a copolymer of an olefin such as polyoctadecene-1 and a monomer having the structure:

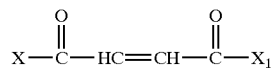

wherein X and X1 are the same or different provided that at least one of X and X1 is such that the copolymer can function as a carboxylic acylating agent. The copolymer of octadecene-1 and maleic anhydride, the copolymer having a number average molecular weight from greater than 6,300 to less than 12,000. Preferably the number average molecular weight of the copolymer is in the range from greater than 6,300 to 11,200, more preferably from 6,650 to 8,050, corresponding to an average number of recurring units preferably in the range from greater than 18 to 32, more preferably from 19 to 23. It is understood that such a copolymer is produced by the alternating copolymerization of octadecene-1 and maleic anhydride as opposed to the reaction of maleic anhydride with a preformed polymer of octadecene-1. The copolymers are readily prepared by the copolymerization of maleic anhydride and octadecene-1 by refluxing the two together in a hydrocarbon solvent in the presence of a free radical polymerization initiator. A suitable method is described in, for example, BG-A-1,121,464 (Monsanto Co.).

The molecular weight of the copolymer is preferably in the range 2,000 to 50,000, typically about 5,000 to 30,000.

A preferred copolymer is a copolymer of polyoctadecene-1 and maleic anhydride. This can be readily prepared by refluxing a mixture of octadecene-1 and maleic anhydride in a hydrocarbon solvent in the presence of a free radical polymerization initiator. A suitable method is described in, for example, GB-A-1,121,464 (Monsanto Co.).

The emulsifier useful for this invention is made by reacting A.) a polyacidic polymer and B.) at least one fuel soluble product made by reacting at least one hydrocarbyl-substituted carboxylic acid acylating agent with ammonia, an amine or a polyamine. In another embodiment the emulsifier is made by mixing the emulsifier of the reaction of A and B above with at least one of an ionic or a non-ionic compound having a hydrophilic-lipophilic balance of about 1 to about 40.

The reaction of polyacidic polymer with the fuel soluble product (i) with the (B) at least one fuel soluble product made by reacting at least one hydrocarbyl-substituted carboxylic acid acylating agent with ammonia, an amine or a polyamine, is carried out as a condensation or condensation-polymerization reaction which may take the form of an emulsion, solution, suspension, continuous addition bulk or the like. This reaction can be carried out as a batch, semi-batch, a continuous process or the like.

In one embodiment, amine is added to a stirred flask containing a mixture of polyacidic polymer and diluent or solvent at elevated temperature. In another embodiment, the fuel soluble product is formed in an initial step. The fuel soluble product may, or may not contain solvent. Polyacidic polymer is then added to a stirred flask containing the fuel soluble product and the reaction temperature is raised. In either embodiment, the reaction is stirred at elevated temperature for a period of time until reaction is deemed complete, and the product is then collected. The reaction temperature may be in the range of about 60° C. and about 250° C., preferably in the range of about 100° C. and about 200° C. and more preferably in the range of about 120° C. and about 170° C. The reaction may be carried out at elevated or reduced pressure, but is preferably carried out at atmospheric or slightly below atmospheric pressure. The reaction may be carried out over any period from about 30 minutes to about 24 hours, preferably about 2 to about 8 hours and more preferably 3–5 hours.

The emulsifier produced from the reaction product of the polyacidic polymer with the fuel soluble product (i) comprises about 25% to about 95% of fuel soluble product and about 0.1% to about 50% of the polyacidic polymer; preferably about 50% to about 92% fuel soluble product and about 1% to about 20% of the polyacidic polymer, and most preferably about 70% to about 90% of fuel soluble product and about 5% to about 10% of the polyacidic polymer. In one embodiment the emulsifier is described as a polyalkenyl succinimide crosslinked with an olefin/maleic anhydride copolymer.

The emulsion gives good stability relative to other water fuel emulsifiers. This results in greater long-term stability of the emulsion. There is a overall improvement in emulsion stability relative to existing emulsifiers such as esters and salts of poly-iso-butene succinic anhydrides.

Cetane Improver

In one embodiment, the water-fuel emulsion contains a cetane improver. The cetane improvers that are useful include but are not limited to peroxides, nitrates, nitrites, nitrocarbamates, and the like. Useful cetane improvers include but are not limited to nitropropane, dinitropropane, tetranitromethane, 2-nitro-2-methyl-1-butanol, 2-methyl-2-nitro-1-propanol, and the like. Also included are nitrate esters of substituted or unsubstituted aliphatic or cycloaliphatic alcohols which may be monohydric or polyhydric. These include substituted and unsubstituted alkyl or cycloalkyl nitrates having up to about 10 carbon atoms, and in one embodiment about 2 to about 10 carbon atoms. The alkyl group may be either linear or branched, or a mixture of linear or branched alkyl groups. Examples include methyl nitrate, ethyl nitrate, n-propyl nitrate, isopropyl nitrate, allyl nitrate, n-butyl nitrate, isobutyl nitrate, sec-butyl nitrate, tert-butyl nitrate, n-amyl nitrate, isoamyl nitrate, 2-amyl nitrate, 3-amyl nitrate, tert-amyl nitrate, n-hexyl nitrate, n-heptyl nitrate, n-octyl nitrate, 2-ethylhexyl nitrate, sec-octyl nitrate, n-nonyl nitrate, n-decyl nitrate, cyclopentyl nitrate, cyclohexyl nitrate, methylcyclohexyl nitrate, and isopropylcyclohexyl nitrate. Also useful are the nitrate esters of alkoxy-substituted aliphatic alcohols such as 2-ethoxyethyl nitrate, 2-(2-ethoxy-ethoxy) ethyl nitrate, 1-methoxypropyl-2-nitrate, 4-ethoxybutyl nitrate, etc., as well as diol nitrates such as 1,6-hexamethylene dinitrate. A useful cetane improver is 2-ethylhexyl nitrate.

The concentration of the cetane improver in the water-fuel emulsion may be at any concentration sufficient to provide the emulsion with the desired cetane number. In one embodiment, the concentration of the cetane improver is at a level of up to about 10% by weight, and in one embodiment about 0.05 to about 10% by weight, and in one embodiment about 0.05 to about 5% by weight, and in one embodiment about 0.05 to about 1% by weight.

Additional Additives

In addition to the foregoing materials, other fuel additives that are well known to those of skill in the art may be used in the water-fuel emulsions of the invention. These include but are not limited to dyes, rust inhibitors such as alkylated succinic acids and anhydrides, bacteriostatic agents, gum inhibitors, metal deactivators, upper cylinder lubricants, and the like. These additional additives may be used at concentrations of up to about 1% by weight based on the total weight of the water-fuel emulsions, and in one embodiment about 0.01 to about 1% by weight.

The total concentration of chemical additives, including the foregoing emulsifiers, in the water-fuel emulsions of the invention may range from about 0.05 to about 30% by weight, and in one embodiment about 0.1 to about 20% by weight, and in one embodiment about 0.1 to about 15% by weight, and in one embodiment about 0.1 to about 10% by weight, and in one embodiment about 0.1 to about 5% by weight.

Organic Solvent

The additives, including the foregoing emulsifiers, may be diluted with a substantially inert, normally liquid organic solvent such as naphtha, benzene, toluene, xylene or diesel fuel to form an additive concentrate which is then mixed with the fuel and water to form the water-fuel emulsion. These concentrates (extrapolate) generally contain from about 10% to about 90% by weight of the foregoing solvent.

The water-fuel emulsions may contain up to about 60% by weight organic solvent, and in one embodiment about 0.01 to about 50% by weight, and in one embodiment about 0.01 to about 20% by weight, and in one embodiment about 0.1 to about 5% by weight, and in one embodiment about 0.1 to about 3% by weight.

Antifreeze Agent

In one embodiment, the water-fuel emulsions of the invention contain an antifreeze agent. The antifreeze agent is typically an alcohol. Examples include but are not limited to ethylene glycol, propylene glycol, methanol, ethanol, glycerol and mixtures of two or more thereof. The antifreeze agent is typically used at a concentration sufficient to prevent freezing of the water used in the water-fuel emulsions. The concentration is therefore dependent upon the temperature at which the fuel is stored or used. In one embodiment, the concentration is at a level of up to about 20% by weight based on the weight of the water-fuel emulsion, and in one embodiment about 0.1 to about 20% by weight, and in one embodiment about 1 to about 10% by weight.

The Engines

The engines that may be operated in accordance with the invention include all compression-ignition (internal combustion) engines for both mobile (including marine) and stationary power plants including but not limited to diesel, gasoline, and the like. The engines that can be used include but are not limited to those used in automobiles, trucks such as all classes of truck, buses such as urban buses, locomotives, heavy duty diesel engines, stationary engines (how define) and the like. Included are on- and off-highway engines, including new engines as well as in-use engines. These include diesel engines of the two-stroke-per-cycle and four-stroke-per-cycle types.

The Filter/Trap

The filter used in accordance with the invention are any of those commercially available or known in the art. Generally the filter contains the following components: 1) a filter medium, 2) a regeneration system, and 3) a monitoring system. The filter for diesel engines generally needs to withstand high operating temperatures, exothermic conditions resulting from the filter regeneration process, rapid temperature fluctuations and the like. The filter is generally housed in an in-line converter or converter muffler in the exhaust system. Filters can be deployed for new engines and also retrofitted to existing older engines. Thus they are suitable for rapid and widespread application to reduce particulate matter exposure.

Particulate filters need to be effective in the range of diesel particulates, starting from primary particulates to about 500 nm. The filters need to have a high filtration efficiency for nano-particulates, generally in the range from about 10 mm to 500 nm. The filter should have low pressure drop and long durability.

The filter media is a passive structure that intercepts the solid particles. The intercepted particulates are retained on the filter medium. Generally the filter medium is classified as surface filters, deep bed filters or hybrids.

Typically, the filter medium is a high-surface area structure of temperature-resistant material including but not limited to ceramics or silicon carbide substrates, fiber structures, or the like. The filter medium includes but is not limited to ceramic or silicon carbide monolith cell filters, sintered metal filters, wound fiber filters, knitted fiber filters, fiber weaves, filter papers/filter felts, and the like.

The ceramic monolith cell filters are similar to cell catalytic converters. The cells are generally closed at alternating ends and have a large surface area in the range of about 1 to about 3 $m^2/l$. Accordingly, the pressure drop is low and the filtration efficiency is high, at low gas velocities of about a few cm/s through the cell wall. These filters are typically cordierite extrusion, silicon carbides, and the like. The structures are largely resistant to thermal shock. Ceramic monolith cell filters are available from Corning, Notox, NGK, and Ibiden.

Sintered metal filters have a structure similar to the ceramic monolith filters. Sintering creates walls with controlled porosity that effectively trap nano-particulates. They have high thermal conductivity. The sintered metal filters are available from SHW.

Wound fiber filters are made from yarn that is prepared from high-temperature fiber materials such as mullite (Nextel available from 3M). The yarn is wound on a perforated carrier tube to create rhombic canal structures. Wound fiber filters are available from 3M and Mann and Hunnel.

Knitted fiber filters are made from ceramic yarn that is knitted and folded into deep structures. The fiber surface typically attains 200 $m^2/l$. The preferred flow direction is radially outwards. The filters may have catalytic coatings and internal electrical heatings. Knitted fiber filters are available from Buck.

Fiber weaves are high-temperature fibers woven and fixed to metallic carrier structures for filtration. Fiber weaves are available from 3M and HUG.

Filter papers and filter felts are disposable filters constructed like an inlet filter. The papers/felts are made from fiber filters, ceramic fibers, and the like. Short fibers are arranged in a random form and the structure is fixed using binders. Typically these are used at temperatures less than 250° C. Ceramic fiber felts can be deployed for higher temperatures.

The filter, fitted or retrofitted to diesel engines, becomes clogged with soot that needs to be removed to prevent the filter from exhibiting high exhaust restriction, loss of engine power, loss of fuel economy, increased engine out emissions and potential filter failure. The regeneration is typically performed through combustion of the retained soot. Regeneration can be active and/or passive or continuous or combinations thereof. Continuous regeneration typically occurs through the use of a pre-catalyst, ahead of the particulate filter, which converts nitrogen oxide (NO) in the exhaust to nitrogen dioxide ($NO_2$). The $NO_2$, which is highly acidic, promotes the combustion of the soot in the particulate filter at exhaust temperatures reported as low as 270° C.

Passive regeneration denotes spontaneous regeneration upon reaching certain operating conditions. This is typically performed through the use of catalyzed particulate filters, which have been coated with heterogeneous soot ignition catalysts. Passive regeneration may also be performed through the use of fuel soluble homogenous catalysts such as Cerium (Ce), Iron (Fe) or mixtures of Platinum (Pt)/Cerium (Ce).

An active regeneration system denotes controlled triggering of regeneration. This may be done by using the exhaust back-pressure as a feedback signal or signals such as elapsed time since previous regeneration, detection of carbon accumulation, signals from combined engine parameters indicating a specific engine mode where conditions are right to initiate a soot regeneration process and the like. In some systems regeneration functions can be performed manually with dismounting of the filter or on-board without dismounting the filter. The typical regeneration systems include but are not limited to full flow burner, partial flow burner, electrical heating, electric heaters, thermal and non-thermal plasma, microwave, engine control measures (i.e., fuel injection timing, control of turbocharging, intake air, exhaust throttling, and the like) and the like. Active regeneration systems typically employ a heat source (fuel burner, electrical element, and the like) installed in the plenum of the particulate trap. The heat source may be used with full exhaust flow or partial exhaust flow. The heat source is intended to heat the exhaust gas until the regeneration temperature is reached, which is generally to a temperature greater than about 600° C. The heat source is activated either when the exhaust backpressure surpasses a threshold value or a defined amount of operating time. After regeneration, the heat source is extinguished and soot is again allowed to build up in the trap.

The heat source may be operated under one or two regeneration strategies-full operational exhaust flow or partial exhaust flow.

In a full operational exhaust flow, the heat source would be triggered during normal driving conditions. This requires the burner to heat the entire exhaust flow which requires considerable heat energy.

In a partial flow regeneration strategy, a diesel particulate filter is operated with an exhaust bypass valve or as a twin filter system. During regeneration, the exhaust flow to the filter to be regenerated is reduced to a controlled flow rate. During this regeneration event, the diverted exhaust flow is either bypassed or run through the second particulate filter of a twin filter system. A partial flow strategy can be desirable as a method to conserve the energy required to heat the entire exhaust flow.

Electrical energy can also be used to supply heat to regenerate the filter under full exhaust flow or partial exhaust flow. This energy may be provided by other on-board systems but is more likely to be supplied by an external power connection. Typically, this regeneration strategy requires the vehicle or engine to be taken out of service and hooked up to a specific electrical control panel to allow regeneration to occur.

In original equipment, the engine itself can also be controlled to generate additional exhaust temperature by controlling the fuel injection timing, degree of turbocharging, intake air restriction, exhaust throttling, etc. These measures can be effectively controlled to produce the desired exhaust temperatures to regenerate a particulate filter.

Combinations of several different regeneration methods are also possible such as the use of fuel additives with heating systems, catalytic coating with heating, or the like. These combinations can reduce the energy requirements to heat the exhaust gas for regeneration.

In addition to the soot, the particulate filter also traps inert ash components. Ash components may clog the filter element during operation. Ash particulates are generally not combustible. Thus the filter element should be periodically replaced or cleaned.

The water/fuel blend in combination with a filter reduces the particulate matter emissions. Further, the total particulate mass flow rate emitted by the engine is reduced, thus there is a reduction in particulate mass accumulation rate in the particulate filter, and as a result there is a reduced exhaust system back-pressure. This means that a reduction in the size of the particulate filters can be acheived. Further, the time for soot loading the filter is increased before the filter needs to be regenerated. The inventive process extends the use of the passive regeneration particulate filter beyond the standard operating conditions recommended by the manufacturers, typically 300° C.

The reduction in exhaust system backpressures also promotes fuel efficiency and allows for greater engine power when equivalent size particulate filters are employed. The reduced soot loading decreases the frequency of regeneration for actively regeneration particulate filters resulting in improved fuel economy and reduced energy consumption.

The reduction in total particulates has been shown to be predominantly a reduction in the insoluble carbon fraction (elemental carbon portion) as opposed to reduction in the soluble organic fraction (volatile organic fraction). This results in the observation that an engine running water blended fuel equipped with a diesel particulate filter which relies on an exhaust fuel burner to regenerate, requires less frequent regeneration and/or uses less fuel during regeneration. Further, this results in the observation that an engine running water blended fuel equipped with a diesel particulate filter which relies on passive regeneration (filter supported heterogeneous soot ignition catalysts or fuel borne soot ignition additives) or continuous regeneration (regeneration by the action of $NO_2$) can be operated under lower temperature duty cycles with less soot accumulation and thus, requires less operating time at higher exhaust temperatures to burn the accumulated soot.

Continuous regeneration typically occurs through the use of a pre-catalyst, ahead of the particulate filter, which converts nitrogen oxide (NO) in the exhaust to nitrogen dioxide ($NO_2$). The $NO_2$ which is highly acidic promotes the combustion of the soot in the particulate filter at exhaust temperatures reported as low as 270° C. Traps which employ continuous regeneration typically require a minimum NOx/PM ratio. This ensures that enough $NO_2$ can be generated to oxidize the accumulated particulate.

As the use of an emulsified fuel reduces the total particulate emissions by a greater percentage than the NOx emissions, it is affording a more favorable NOx/PM ratio which, will extend the application limit of continuously regenerative trap technologies.

Thus, the use of water blended fuel and a diesel particulate filter effectively extends the operational low temperature application limit of passive or continuous catalyst, which allows passive or continuous regeneration strategies to be employed on vehicles with colder vehicle duty cycles.

EXAMPLE 1

The following example illustrates the inventive process. The vehicle tested is an Olympian bus with Euro 2 engine technology being turbo charges, 6 cylinder, 9600 cc, automatic transmission and EEC emissions type 91/542 EWG which is mechanically fuel injected and equipped with an automatic gearbox. The diesel engine has a maximum rated power of 183 kW at 2000 rpm, and 1050 Nm torque at 1450 rpm. A chassis dynamometer is installed on the vehicle. The vehicle is tested at curb weight with an additional load value simulating a typical passenger load.

Emissions were measured over the Millbrook London Transport Bus Cycle. The test cycle consists of two phases, an inner and outer London phase representing urban and suburban operations, respectively. The inner part of the cycle consists of a highly transient operation, with prolonged periods at idle and reaching a maximum speed of about 35 km/h. The outer part of the cycle is also highly transient, but less time is spent at idle and a maximum speed of about 50 km/h is attained. The percentage change values gives a simple means of comparing the water blend fuel to a given base ULSD case with equivalent exhaust after treatment.

The emissions tests were conducted in a Variable Temperature Emissions Chamber (VTEC) facility. The dynamometer used allows for full load road and inertia simulation permitting an accurate comparison to be made between laboratory test protocol and on-highway testing. The exhaust gases are sampled via a full flow constant volume sampling (CVS) system; the methodology is similar to that used for passenger car and light duty commercial vehicles for emissions type approval.

The vehicle emissions were stabilized by 8 hours of driving on a test track on each test fuel prior to its use in the VTEC. The time was similarly employed to ensure that the filter was conditioned.

Table I gives data on the performance of a diesel particulate filter (dpf) with 1) ULSD and 2) water blended fuel (wbf) compared to a base ULSD case.

TABLE I

PERCENTAGE CHANGE IN EMISSIONS FOR ULSD WITH EXHAUST AFTER-TREATMENT COMPARED TO A ULSD BASE CASE

| Cycle | After-treatment | HC | CO | $NO_x$ | $CO_2$ | PM |
|---|---|---|---|---|---|---|
| Inner | | | | | | |
| WBF | None | −10.3% | +3.9% | −18.0% | −3.0% | −45.8% |
| ULSD | DPF | −6% | +4.9% | +0.4% | +2.6% | −81% |
| WBF | DPF | −15.3% | +3.7% | −20.0% | −3.7% | −83.6% |
| Outer | | | | | | |
| ULSD | DPF | −5.7% | +2.3% | +1.3% | +2.0% | −81% |
| WBF | DPF | −17.2% | +2.8% | −20.2% | −3.9% | −81% |

The results demonstrate that when water blended fuel is used in combination with a diesel particulate filter system that greater reductions in $NO_x$, $CO_2$ and PM occur when compared to the use of water blended fuel and diesel particulate filter systems individually.

The data demonstrates the viability of water-blend fuels as a means of reducing engine exhaust emissions and the compatibility of said fuel with diesel particulate filter systems. A filter produces a reduction in particulate matter emissions. The combination of water-blend fuel with exhaust after-treatment filter reduces particulate matter, increases the longevity of the filter, and improves the regeneration life cycle of the filter.

PuriNOx Composition for Examples 2, 3 and 4

| Components | Parts by weight |
|---|---|
| Diesel Fuel | 77.0 |
| Deionized Water | 20.12 |
| Emulsifier 1[1] | 0.213 |
| Emulsifier 2[2] | 1.20 |
| Emulsifier 3[3] | 0.594 |
| 2-ethylhexylnitrate | 0.714 |
| Ammonium Nitrate | 0.15 |

[1]Ester/salt prepared by reaction hexadecenyl succinic anhydride with dimethylethanolamine at a mole ratio of 1.1
[2]ester/salt by reacting polyisobutylene (mn = 2000) substituted succinic anhydride (ratio of succinic groups to polyisobutylene equivalent weights of 1.7–2.0 with dimethylethanolamine in an equivalent weight ratio of 1:1 (1 mole succinic anhydride acid group to 2 moles of amine).
[3]Imide/amide/salt made by reacting a polyamine enriched in tetraethylenepentamine with polyisobutylene (Mn = 1000) substituted succinic anhydride (ratio of succinic groups to polyisobutylene equivalent weights of 1.7–2.0) at a ratio of 4 carbonyls to 3 nitrogens.

EXAMPLE 2

The following example illustrates the inventive process. The test results reported herein were generated by the Department of Emissions Research (DER), Automotive Products and Emissions Research Division of Southwest Research Institute (SwRI). This study was run as SwRI Project 08.04159, titled "Testing of PuriNOx Fuel using the CARB Interim Procedure for Certification of Emission Reductions for Alternative Diesel Fuels" available from Carbon Composites Co., P. O. Box 79177, Paig, Hi., 96770, U.S.A., www.carb.com. In this study a series of FTP hot-start transient emission results obtained on a 1991 Detroit Diesel Corporation (DDC) Series 60 heavy-duty diesel engine using a reference fuel, Fuel R, and a water blended diesel fuel, known as PuriNOx fuel, Fuel C. Fuels R and C, both described below, meet the specifications defined in the (CARB) Procedure for Certification of Emissions Reductions for Alternative Fuels.

The 1991 Series 60 heavy-duty diesel engine was mounted in a transient-capable test cell. The exhaust was routed to a full flow constant volume sampler (CVS) that utilizes a positive displacement pump (PDP) as shown in FIG. 1. Total flow in the tunnel was maintained at a nominal flow rate of about 2,000 SCFM. Sample Zone probes for total particulate (PM), heated NOx, heated HC, CO and $CO_2$ measurements were connected to the main tunnel. Probes for background gas measurement were connected downstream of the dilution air filter pack but upstream of the mixing section. The dilution system was equipped with pressure and temperature sensors at various locations in order to obtain all necessary information required by the U.S. Code of Federal Regulation (CFR 40, Part 86, Subpart N).

The reference fuel, Fuel R, meets the compositional, chemical and physical specifications described in section (5), Reference Fuel Specifications, of the Interim Procedure for Certification of Emission Reductions for Alternative Diesel Fuels and is a CARB diesel fuel.

The PuriNOx fuel, Fuel C, meets the compositional, chemical and physical specifications described in section (4), Applicability, Description and Fuel Parameters of Alternative Diesel Fuels, of the Interim Procedure for Certification of Emission Reductions for Alternative Diesel Fuels. The composition of PuriNOx fuel was: 77% wt. CARB diesel fuel meeting the specification for 2-D diesel fuel set forth in ASTM D975+3% wt. PuriNOx additive package +20% wt. Water.

For each of seven days, three consecutive hot-start transient runs, with a 20-minute engine-off soak between runs, were performed on each of Fuel R and Fuel C. All transient emissions tests were conducted according to the EPA Federal Test Procedure (FTP) specified in CFR40, Part 86, Subpart N. The first run of Fuel R was used to generate a single transient command cycle that was used for all emission tests.

The test protocol was transformed into a specific test sequence to maintain statistical anonymity. Regulated emissions of HC, CO, $CO_2$, $NO_x$, and total particulate matter (PM) were measured. In addition, the particulate filters were analyzed for soluble organic fraction (SOF), and sulfate ($SO_4$). Procedures for the measurements of HC, CO, $CO_2$, NOx, and PM are described in Subpart N of CFR 40, Part 86.

A pair of 90 mm Pallflex filters were used for particulate measurements on each run. A twenty-five percent portion of the particulate filter pair was used for the $SO_4$ analysis and another twenty-five percent portion was used to measure the Soluble Organic Fraction (SOF). The SOF was determined by extracting the particulate filter portion using a Soxhlet apparatus with toluene-ethanol solvent. After extraction, the filter was weighed for the second time to determine the amount of SOF extracted. For $SO_4$, the particulate filter portion was leached with an isopropanol-water solution. The solution was analyzed for $SO_4$ using Ion chromatography.

Samples were collected by bubbling dilute exhaust through two chilled glass impingers containing an acetonitrile solution of 2,4-DNPH and perchloric acid and mounted in series. For analysis, a portion of the acetonitrile solution was injected into a liquid chromatograph equipped with a UV detector. For IHC samples of the dilute exhaust were collected in bags and later analyzed for hydrocarbons in the range from $C_1$ to $C_{12}$. Particulate phase PAHs were collected using a 20×20-inch Pallflex filter, and gas phase PAHs were collected downstream of the 20×20 inch filter using PUF/XAD-2 traps. The extract from the filters and the PUF/XAD-2 traps were extracted and specific portion of the extracts were combined for further analysis.

The average results of the studies are reported in Table II below.

loading rate and frequency of regeneration with water blended fuel, should allow the longer periods of operation at cooler exhaust temperatures as long as the 300° C. requirement was met for some reduced portion of the duty cycle.

The data also indicates that particulate filters which undergo continuous regeneration (through the action of $NO_2$) should be favorably effected when water blended fuel is used as the NOx/PM ratio is favorably effected. In this study, NOx was reduced by 14.4% and PM was reduced by

TABLE II

Summary of the Average Values for HG, CO, NOx, PM, SOF, and $SO_4$

| Fuel Type | | BSNOx g/hp-hr | BSPM g/hp-hr | SOF g/hp-hr | $SO_4$ g/hp-hr | BSHC g/hp-hr | BSCO g/hp-hr | BSCO2 g/hp-hr | BSFC lb/hp-hr | Ref.[a] Work hp-hr | Actual[b] Work hp-hr |
|---|---|---|---|---|---|---|---|---|---|---|---|
| R | Average | 4.21 | 0.191 | 0.047 | 0.0010 | 0.110 | 2.38 | 534.54 | 0.375 | 24.72 | 24.99 |
|   | Std. dev. | 0.07 | 0.003 | 0.006 | 0.0001 | 0.028 | 0.08 | 8.55 | 0.01 | 0.00 | 0.04 |
|   | % COV | 1.8 | 1.6 | 12.3 | 13.1 | 25.7 | 3.4 | 1.6 | 1.6 | 10.0 | 0.2 |
| C | Average | 3.62 | 0.071 | 0.056 | 0.0006 | 0.166 | 1.28 | 531.52 | 0.458 | 24.72 | 24.07 |
|   | Std. dev. | 0.05 | 0.002 | 0.005 | 0.0000 | 0.038 | 0.05 | 5.54 | 0.005 | 0.00 | 0.03 |
|   | % COV | 1.3 | 2.3 | 8.0 | 11.0 | 23.0 | 4.0 | 1.0 | 1.1 | 0.0 | 0.1 |

This is the reference work for transient command cycle used for every test based on first transient torque map given in Table 2.

From Table II, the reference fuel, Fuel R, yielded an average value for NOx emissions of 4.21 g/bhp-hr. The PuriNOx fuel, Fuel C, yielded an average value for NOx of 3.62 g/bhp-hr, a reduction of 14.4% from the reference fuel.

From Table II, the reference fuel, Fuel R, yielded and average value for PM emissions of 0.191 g/bhp-hr. The SOF portion of the PM was found to be 0.047 g/bhp-hr or 24.5% of the PM emissions for the reference fuel. This corresponds to a residual insolubles content of 75.5% (defined as to include the constituents of the remaining particulate matter after SOF extraction).

From Table II, the PuriNOx fuel, Fuel C, yielded and average value for PM emissions of 0.071 g/bhp-hr, a reduction of 63% from the reference fuel. The SOF portion for Fuel C, was found to be 0.056 g/bhp-hr or 78.9% of the PM emissions for the PuriNOx fuel. This corresponds to a residual insolubles content of 21.1%.

The results demonstrate that the use of water blended fuel results in significant reductions of NOx, PM and specifically the residual insolubles content of the PM.

The data further demonstrates the viability of water-blend fuels as a means of reducing engine exhaust emissions and the compatibility of said fuel with diesel particulate filter systems.

The combination of water-blend fuel with any diesel particulate filter will increase the longevity of the filter by significantly reducing the number of regenerations that a filter will undergo during its lifetime. In these studies the average PM reduction of 63% was found. This should correlate to a reduction in the soot loading rate of a particulate filters and a decrease in the frequency of regeneration when installed on an engine running water blended fuel.

Further, the resulting lower soot loading of the filter should result in the ability to extend the use of passive particulate filters to vehicle/equipment duty cycles, which are characterized by cooler exhaust temperatures.

For example, a manufacturer reports that a given passive particulate filter for a diesel-fueled engine, requires that 20% of the equipment/vehicle duty cycle produce exhaust temperatures greater than 300° C. The reduction in the soot 63%. This favorable shift in the NOx/PM ratio means that significantly reduced PM mass will be accumulated requiring significantly less $NO_2$ to combust. As less $NO_2$ would be required, this means that less conversion of NO to $NO_2$ will be required and this should allow extended operation at cooler exhaust temperatures.

Actively regenerated particulate filters should also benefit from the lower soot accumulation rate. If heat is produced on-board (engine controls, electric element, or fuel burner) to regenerate the filter, this regeneration will be less frequent resulting in lower energy consumption and/or equivalent fuel penalty.

Actively regenerated particulate filter systems which are regenerated off-board will be able to be used longer prior to filter change-out for regeneration. This will reduce energy consumption and labor cost. Reduced interruption of vehicle use for regeneration, will also increase productivity.

Procedure for Examples 3 and 4 using a Caterpillar 1Y3700 Engine

Engine

The Caterpillar 1Y3700 engine is a single cylinder oil test engine (SCOTE) based on the Caterpillar 3406E engine and is representative of Caterpillar's engine technology of the mid 1990's.

The engine is an electronically controlled, direct injection, in-head cam shaft, single cylinder diesel engine with a four valve arrangement. It has a 137.2 mm bore and a 165.1 mm stroke resulting in a displacement of 2.4 L. The electronic control module (ECM) defines the desired engine fuel timing.

The engine utilized a two-piece articulated piston typical of high output engines. Additionally, the engine arrangement consists of both intake and exhaust surge tanks to dampen pressure pulses.

The engine is supercharged with pressure air from a centralized two-stage compressor. Intake boost air pressure is controllable over a wide range of operating conditions by utilizing a control valve.

Exhaust back pressure is also controlled by a control valve. The combination of intake air pressure, exhaust back pressure and fueling rates provides more control in engine out gas conditions than is possible with a fixed turbocharger arrangement.

Test Cell: The engine is coupled to an eddy current dynamometer and is operated in closed loop control with either fuel flow, power, or exhaust temperature (cylinder head out temperature).

The test cell is fully instrumented for all key engine operating temperatures, pressures, flows, speeds and loads. All parameters are fed into a data acquisition and control system.

Soot Generation Hardware: A diesel particulate filter assembly is installed between the engine exhaust port and the inlet of the exhaust surge tank. This installation is in the pressured pre-turbine section of the engine versus a tail pipe application (see FIG. 1). Between the exhaust port on the cylinder ahead and the canister assembly, is an exhaust intercooler which keeps the filter in temperatures precisely controlled at 200° C.

Soot Regeneration Cycle: The soot regeneration hardware is basically the same as the soot production hardware minus the exhaust intercooler. The DAC software is programmed to run a 16-step regeneration cycle over a 5.3-hour period. Each step of the cycle operates in closed loop exhaust temperature control (filter in temperature) for 20 minutes each. The cycle begins at 200° C. and steps up in increments of 25° C. until 300° C. Between 300° C. and 350° C., the steps are in 10° C. increments. From 350° C.–500° C., the steps are in the 25° C. increments. Differential pressure across the filter is also monitored.

Soot Loading Determination: Soot is collected over a defined period of time to hit a target soot loading. To determine soot loading rates, the engine is periodically stopped and the filter is removed while hot and is hung from a 25 lb. load cell which is calibrated immediately preceding each weight measurement. The load cell arrangement has an minimum accuracy of about 1 gram.

EXAMPLE 3

The following example illustrates the inventive process. These studies were performed to illustrate the improvements in soot loading characteristics of a particulate filter due to the combustion of water-blended fuel.

Soot was collected over a defined procedure with the objective of reaching an approximate soot loading target of 28 g of soot for subsequent filter regeneration studies. To determine soot loading rates, the engine was periodically stopped and the filter was removed while hot and hung from a 25 lb. load cell which is calibrated immediately preceding each weight measurement. The load cell has a minimum accuracy of 1 gram.

A single catalyzed diesel particulate filter was used in this study. This catalyzed particulate filter is manufactured by the Engine Control Systems Division of Lubrizol Canada. The filter substrate consists of SiC manufactured by IBIDEN and catalyzed by ASEC/Delphi Energy & Engine Management Systems. The filters measured 7.5" in diameter by 6" in length.

For a reference base fuel (with fuel sulfur of 150 ppm), 34 g of soot were collected into the catalyzed particulate filter in 28 hours of prescribed engine operation. This equates to an average particulate filter soot loading rate of 1.21 g/hr.

The composition of PuriNOx fuel used was 77% wt. 150 ppm base diesel fuel meeting the specification for 2-D diesel fuel set forth in ASTM D975+3% wt. PuriNOx additive package+20% wt. Water. After 95 hours of engine operation, 27 grams of soot were collected in the catalyzed diesel particulate filter. This corresponds to an average particulate filter soot loading rate of 0.29 g/hr or approximately 24% of the particulate filter soot loading rate using the 150 ppm base diesel fuel.

The results demonstrate that the soot loading rate was reduced by approximately 76% when PuriNOx fuel was used.

The data further demonstrates the viability of water-blend fuels as a means of reducing engine exhaust emissions and the compatibility of said fuel with diesel particulate filter systems.

The combination of water-blend fuel with any diesel particulate filter increases the longevity of the filter by significantly reducing the number of regenerations that a filter undergoes during its lifetime. In these studies, the average soot loading rate in the test filter was reduced by 76% by the use of PuriNOx fuel. This correlates to a decrease in the frequency of regeneration when installed on an engine running water-blended fuel. This also correlates to reduced exhaust restriction in use which should promote greater engine power, reduced fuel consumption or allows a reduction in the size of the particulate filter.

Further, the resulting lower soot loading rate of the filter with PuriNOx fuel should result in the ability to extend the use of passive particulate filters to vehicle/equipment duty cycles which are characterized by cooler exhaust temperatures.

For example, a manufacturer reports that a given passive particulate filter requires 20% of the equipment/vehicle duty cycle to exhibit exhaust temperatures greater than 300° C. The reduction in the particulate filter soot loading rate and frequency of regeneration should allow the longer periods of operation at cooler exhaust temperatures as long as the 300° C. requirement was met for some reduced time portion of the duty cycle.

The data also indicates that particulate filters, which undergo continuous regeneration (through the action of $NO_2$) are favorably effected when water blended fuel is used as the NOx/PM ratio is favorably effected. In this study, the particulate filter soot loading rate was reduced by 76%. This results in a favorable shift in the NOx/PM ratio which means that significantly reduced PM will be accumulated requiring significantly less $NO_2$ to combust. As less $NO_2$ would be required, this means that less conversion of NO to $NO_2$ will be required and this allows extended operation at cooler exhaust temperatures.

Actively regenerated particulate filters also benefit from the lower soot loading rate. If heat is produced on-board to regenerate the filter, this regeneration will be less frequent resulting in lower energy/fuel penalty.

Actively regenerated particulate filter systems, which are regenerated off-board, are able to be used longer prior to filter change-out for regeneration. This reduces energy consumption and labor cost. The reduction in vehicle downtime also means greater productivity.

EXAMPLE 4

The following example illustrates the inventive process. These studies were performed to illustrate the improvements in exhaust restriction resulting from the reduced soot loading characteristics of a particulate filter due to the combustion of water blended fuel.

Figure 3:
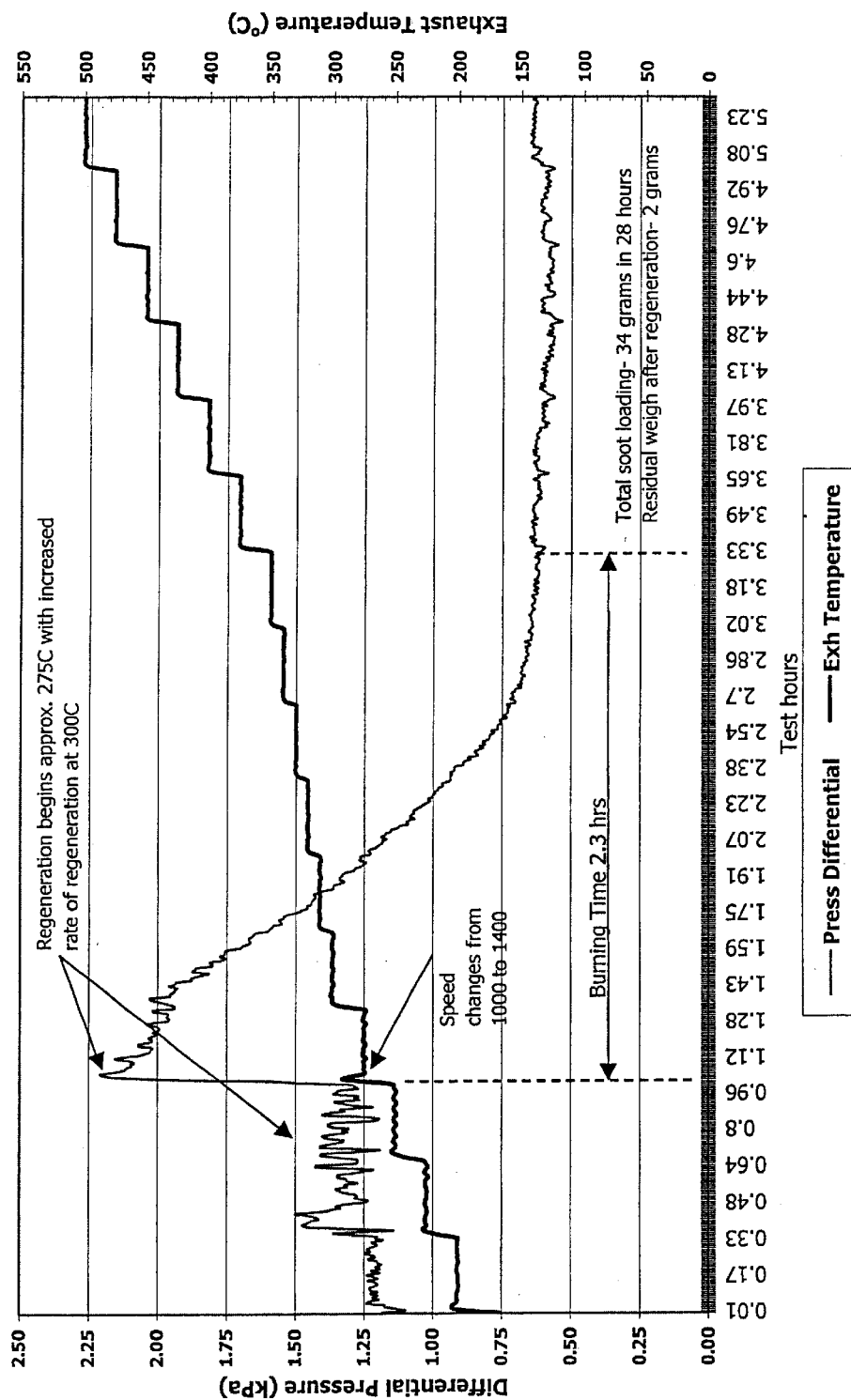
FIG. 3 is a graph of regeneration samples using a sulfur fuel.
Figure 4:
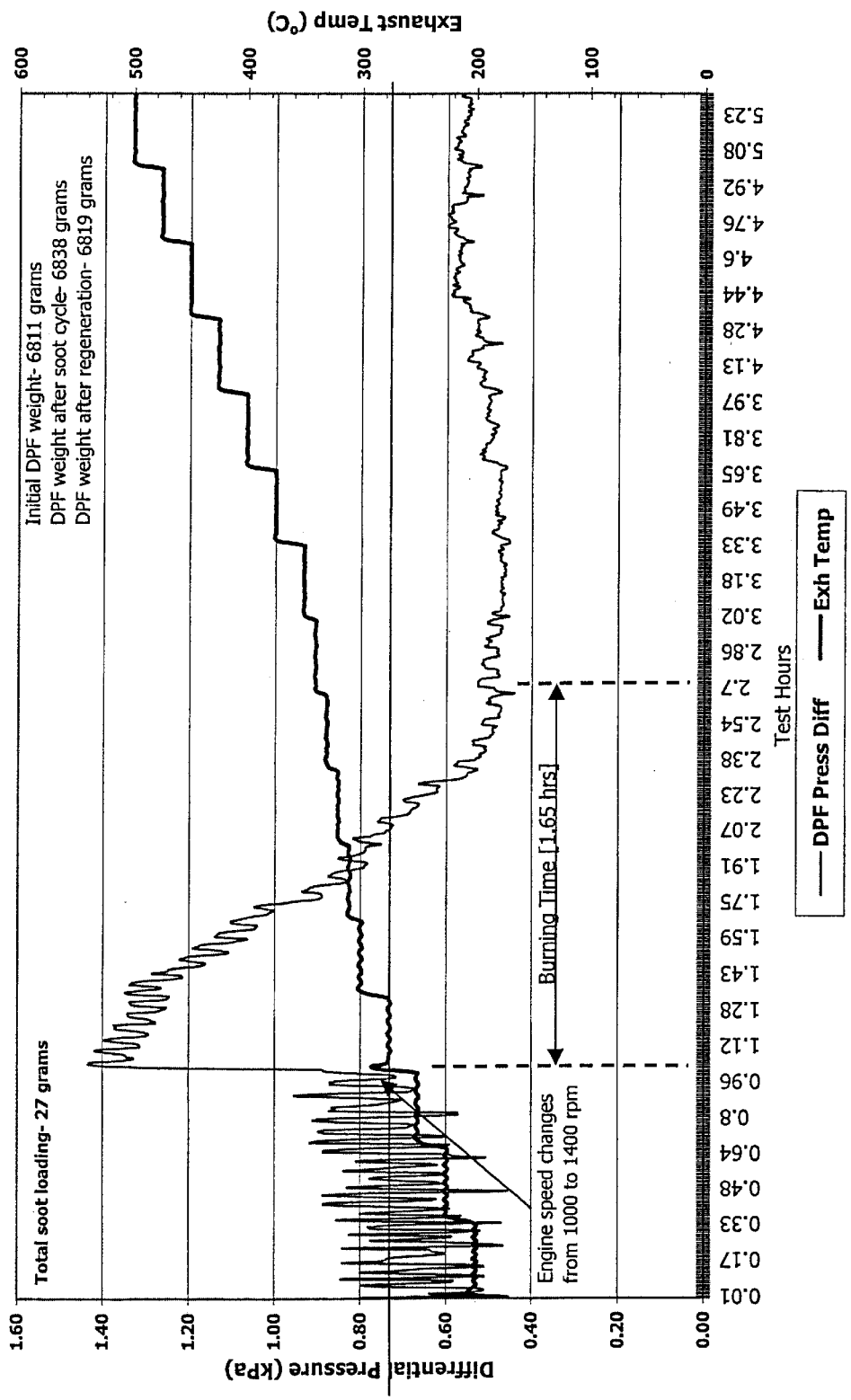
FIG. 4 is a graph of regeneration samples using an emulsified fuel.

FIGS. 3 and 4 show the Exhaust Restriction vs. Time traces for regeneration of the same catalyzed particulate filter on diesel and PuriNOx fuels respectively. In both cases, regeneration commenced upon the step change when engine speed was increased from 1000 to 1400 rpm. This corresponds to an exhaust temperature change from 250° C. to 275° C. These studies showed that both filters regenerated in a similar fashion producing similar traces.

The most significant difference between the two tests was that the catalyzed particulate filter loaded with 27 g of soot emitted from the engine while running PuriNOx fuel over 95 hours, displayed a peak Differential Pressure of 1.45 kPa.

When the same catalyzed particulate filter was loaded with 34 g of soot emitted from the engine while running PuriNOx fuel over 28 hours on the base diesel fuel, it displayed a peak differential pressure of 2.2 kPa. Adjusting for the different soot loading of the filter run on base diesel, it can be estimated that a differential pressure of approximately 1.75 kPa would represent a soot loading of 27 g of soot emitted from the engine running base diesel fuel.

The reason for the difference for the observed lower exhaust restriction on the catalyzed filter loaded with soot from the engine running PuriNOx fuel appears to be a favorable change in the soot permeability. The pressure drop across a diesel particulate filter is inversely affected by the filter/soot combined permeability. This is likely caused by the lower residual insoluble percentage of the soot emitted by the engine running water-blended fuel.

Thus a catalyzed particulate filter loaded with soot from an engine running water blended fuel displays lower exhaust restriction compared to a catalyzed filter loaded with the same mass of soot from an engine running base diesel fuel. This finding results in improvements in engine power, fuel economy or the ability to reduce the size of the particulate filter.

In summary, the following improvements are apparent:

An engine running on emulsified fuel combined with a diesel particulate filter reduces harmful emissions of NOx and PM simultaneously. That an engine running water-blended fuel equipped with a diesel particulate filter displays a lower particulate accumulation rate in the diesel particulate filter. This in turn results in reduced exhaust backpressures (which promotes better fuel economy) or the capability to reduce the size of the diesel particulate filter. That the lower accumulated diesel particulate matter mass in a diesel particulate filter is characterized by a lower proportion of the residual insolubles portion and a higher proportion of the soluble (volatile) organic portion.

That an engine running water-blended fuel equipped with a diesel particulate filter which relies on an exhaust fuel burner or other external supply of heat to regenerate; that the DPF requires less frequent regeneration and uses less fuel/electrical energy. That any engine running water blended fuel equipped with a diesel particulate filter that relies on passive regeneration (filter supported heterogeneous soot ignition catalysts or fuel borne soot ignition additive/catalysts) regenerates less often. Due to the reduced engine-out PM emissions and reduced soot loading characteristics, the use of water-blended fuel and a diesel particulate filter extends the operational low temperature limit of soot ignition catalysts, which allows soot ignition catalysts to be employed on equipment/vehicles with higher proportions of colder exhaust temperatures.

The data also indicates that particulate filters, which undergo continuous regeneration (through the action of $NO_2$) should be favorably affected when water-blended fuel is used as the NOx/PM ratio is favorably affected. In this study, the particulate filter soot loading rate was reduced by 76%. This results in a favorable shift in the NOx/PM ratio which means that significantly reduced PM will be accumulated requiring significantly less $NO_2$ to combust. This means that less conversion of NO to $NO_2$ will be required which allows extended operation at cooler exhaust temperatures.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed:

1. A process for reducing the level of pollutants from the exhaust of a diesel engine comprising (1) operating said diesel engine using as the fuel a water-diesel fuel emulsion, an emulsifier selected from the group consisting of (i) at least one fuel soluble product made by reacting at least one hydrocarbyl-substituted carboxylic acid acylating agent with ammonia or an amine, the hydrocarbyl substituent of said acylating agent having about 50 to about 500 carbon atoms; (ii) at least one of an ionic or nonionic compound having a hydrophilic lipophilic balance (HLB) of about 1 to about 40; (iii) a mixture of (i) and (ii); (iv) a water-soluble compound selected from the group consisting of amine salts, ammonium salts, azide compounds, nitrate esters, nitramine, nitro compounds, alkali metal salts, alkaline earth metal salts, in combination with (i), (ii) or (iii); (v) the reaction product of polyacidic polymer with at least one fuel soluble product made by reacting at least one hydrocarbyl substituted carboxylic acid acylating agent with ammonia, an amine or a polyamine; and (vi), a mixture of (ii) and (v); and (2) contacting the exhaust from said diesel engine with a particulate filter.

2. The process of claim 1 wherein said water diesel fuel emulsion comprises water, diesel fuel and an emulsifier.

3. The process of claim 1 wherein the water-diesel fuel composition includes a discontinuous phase, the discontinuous phase being comprised of aqueous droplets having a mean diameter of 1 micron or less.

4. The process of claim 1 wherein the particulate filter comprises a filter medium, a regeneration system and a monitoring system.

5. The process of claim 4 wherein the filter medium is selected from the group consisting of surface filters, deep bed filters or hybrids thereof.

6. The process of claim 5 wherein the filter medium is selected from the group consisting of ceramic and silicon carbide monolith cell filters, sintered metal filters, wound fiber filters, knitted fiber filters, fiber weaves, filter paper/filter felts and combinations thereof.

7. The process of claim 6 wherein the ceramic monolith cell filters have cells that are closed at alternating ends and have a long surface area in the range of about 1 $m^2/l$ to about 3 $m^2/l$.

8. The process of claim 6 wherein the wound fiber filters are made from a high-temperature yarn that is wound on a perforated carrier tube to form a rhombic canal structures.

9. The process of claim 6 wherein the knitted fiber filters are made from knitted ceramic yarn with the fiber surface about 200 $m^2/l$.

10. The process of claim 6 wherein the fiber weaves are high-temperature fibers woven and fixed to metallic carrier structures for filtration.

11. The process of claim 6 wherein the filter papers and filter felts are made from a material selected from the group consisting fiber filters, ceramic filters, and combinations thereof, and wherein the short fibers are arranged in a random form and structure is fixed using binders.

12. The process of claim 4 wherein the regeneration system is selected from the group consisting of an active regeneration system, a passive regeneration system, a continous regeneration system or combinations thereof.

13. The process of claim 12 wherein the regeneration system is selected from the group consisting of fuel additives, heating systems, catalytic coatings, or combinations thereof.

14. The process of claim 1 wherein the particulate filter has a filtration rate for particulates in the range of about 10 nanometers to about 500 nanometers.

15. The process of claim 1 wherein said diesel engine is a two-strokes-per-cycle engine or a four-strokes-per-cycle engine.

16. The process of claim 1 wherein said pollutants are comprised of NOx, diesel particulate matter, soot, inert ash components, or combinations thereof.

17. The process of claim 1 wherein the particulate filter traps pollutants resulting in a reduction in an insoluble carbon fraction, residual insolubles, non-volatile fraction and combinations thereof of the particulates.

18. The process of claim 1 wherein said water, diesel fuel and emulsion comprises from about 50% to about 98% by weight of diesel fuel; from about 1% to about 50% by weight water, and about 0.05 to 20% by weight of an emulsifier.

19. The process of claim 1 wherein said particulate filter is housed in an inline converter or converter muffler of a diesel engine.

20. The process of claim 1 wherein the time for soot loading the filter is increased before the filter has to be regenerated.

21. The process of claim 1 wherein the reduced soot loading of the filter extends the low temperature operational limits of a passive regeneration particulate filter beyond the standard operating conditions.

22. The process of claim 20 wherein the reduced soot loading decreases the frequency of regeneration for actively regeneration particulate filters resulting in improved fuel economy and reduced energy consumption.

23. The process of claim 1 wherein a favorable change in the NOx/PM ratio by the use of emulsified fuel extends the low temperature operational limits of continuously regenerating passive particulate filters.

* * * * *